United States Patent
Tröster et al.

(10) Patent No.: US 12,258,722 B2
(45) Date of Patent: Mar. 25, 2025

(54) FEED MATERIAL PROCESSING DEVICE AND METHOD FOR APPLYING, DISTRIBUTING AND COMPACTING FEED MATERIAL IN DEFINED LAYER HEIGHTS

(71) Applicant: KOCH SOLUTIONS GMBH, Wadgassen (DE)

(72) Inventors: Peter Michael Tröster, Römerstein-Böhringen (DE); Manuel Hirsch, Creglingen (DE); Fynn Hellweg, Karlsruhe (DE); Adrian Peschina, Knittlingen (DE); Johannes Galenzowski, Karlsruhe (DE); Boya Zhang, Stuttgart (DE)

(73) Assignee: KOCH SOLUTIONS GMBH, Wadgassen (DE)

( * ) Notice: Subject to any disclaimer, the term of this patent is extended or adjusted under 35 U.S.C. 154(b) by 624 days.

(21) Appl. No.: 17/430,882

(22) PCT Filed: Feb. 4, 2020

(86) PCT No.: PCT/EP2020/052699
§ 371 (c)(1),
(2) Date: Aug. 13, 2021

(87) PCT Pub. No.: WO2020/164958
PCT Pub. Date: Aug. 20, 2020

(65) Prior Publication Data
US 2022/0081865 A1    Mar. 17, 2022

(30) Foreign Application Priority Data
Feb. 14, 2019   (DE) ............... 10 2019 201 906.4

(51) Int. Cl.
*E02D 17/18* (2006.01)
*B33Y 10/00* (2015.01)
(Continued)

(52) U.S. Cl.
CPC .............. *E02D 17/18* (2013.01); *B33Y 10/00* (2014.12); *B33Y 30/00* (2014.12); *E01B 2/006* (2013.01);
(Continued)

(58) Field of Classification Search
CPC ......... E02D 17/18; E01C 3/04; E01C 19/185; E01C 21/00; E01B 2/006; E01B 2204/08
(Continued)

(56) References Cited

U.S. PATENT DOCUMENTS 1,090,229 A * 3/1914 Ransome ............ E01C 19/4873
14/71.1
1,163,770 A * 12/1915 Ransome ............ E01C 19/4873
404/105
(Continued)

FOREIGN PATENT DOCUMENTS

| CN | 102174792 A | 9/2011 |
|---|---|---|
| CN | 105908609 A | 8/2016 |

(Continued)

OTHER PUBLICATIONS

Espacenet machine translation of EP 3284867 A1 (Zingg) (Year: 2018).*

(Continued)

*Primary Examiner* — Raymond W Addie
(74) *Attorney, Agent, or Firm* — LUCAS & MERCANTI, LLP; Klaus P. Stoffel

(57) ABSTRACT

A feedstock processing apparatus for applying, distributing, and compacting feedstock in defined layer heights, including a chassis with a traction drive and a first and second undercarriage. A frame structure connects the two undercarriages over a span width of the feedstock processing apparatus. A material feeding device is coupled to the frame structure. A material distributing device is coupled to the (Continued)

material feeding device and is displaceable in certain sections over the span width and configured to apply the feedstock in layers on soil in different, predefinable height positions between the undercarriages. A compacting device is displaceably mounted on the frame structure and/or the material distributing device. The compacting device and the material distributing device can be displaced in a manner dependent on one another respectively along a predefinable movement path.

8 Claims, 14 Drawing Sheets

(51) Int. Cl.
    *B33Y 30/00*     (2015.01)
    *E01B 2/00*     (2006.01)
    *E01C 3/04*     (2006.01)
    *E01C 19/18*     (2006.01)
    *E01C 21/00*     (2006.01)

(52) U.S. Cl.
    CPC .............. *E01C 3/04* (2013.01); *E01C 19/185* (2013.01); *E01C 21/00* (2013.01); *E01B 2204/08* (2013.01)

(58) Field of Classification Search
    USPC .... 404/72, 75, 82, 85, 86, 92, 96, 101, 105, 404/106, 108, 113–116, 118
    See application file for complete search history.

(56) References Cited

U.S. PATENT DOCUMENTS

| | | | | |
|---|---|---|---|---|
| 2,220,149 | A * | 11/1940 | Finley | E01C 7/18 404/82 |
| 3,301,150 | A * | 1/1967 | Hanson | E01C 19/182 404/105 |
| 4,066,723 | A * | 1/1978 | King | E01C 11/18 404/100 |
| 4,073,592 | A * | 2/1978 | Godberson | E01C 19/407 404/82 |
| 5,664,908 | A * | 9/1997 | Paladeni | E04F 21/245 404/103 |
| 5,735,634 | A * | 4/1998 | Ulrich | E01C 19/48 404/108 |
| 6,595,719 | B1 * | 7/2003 | Ohseki | E01C 19/48 404/118 |
| 7,311,465 | B2 * | 12/2007 | Guntert, Jr. | E01C 19/48 404/101 |
| 7,798,744 | B2 * | 9/2010 | Larson | E01C 19/21 404/31 |
| 2003/0108390 | A1 * | 6/2003 | Carlson | E01C 19/405 404/118 |
| 2018/0283001 | A1 | 10/2018 | Erwin et al. | |

FOREIGN PATENT DOCUMENTS

| | | |
|---|---|---|
| CN | 109306649 A | 2/2019 |
| DE | 25 02 094 A1 | 7/1975 |
| EP | 3284867 A1 | 2/2018 |
| GB | 1506421 A1 | 4/1978 |
| WO | 2004/074578 A1 | 9/2004 |

OTHER PUBLICATIONS

English Translation of International Search Report Issued in PCT/EP2020/052699 dated Jun. 7, 2020.
Machine Translation of DE 25 02 094 A1.

* cited by examiner

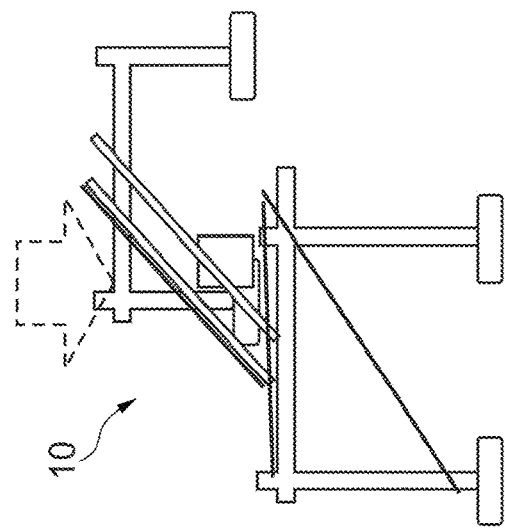
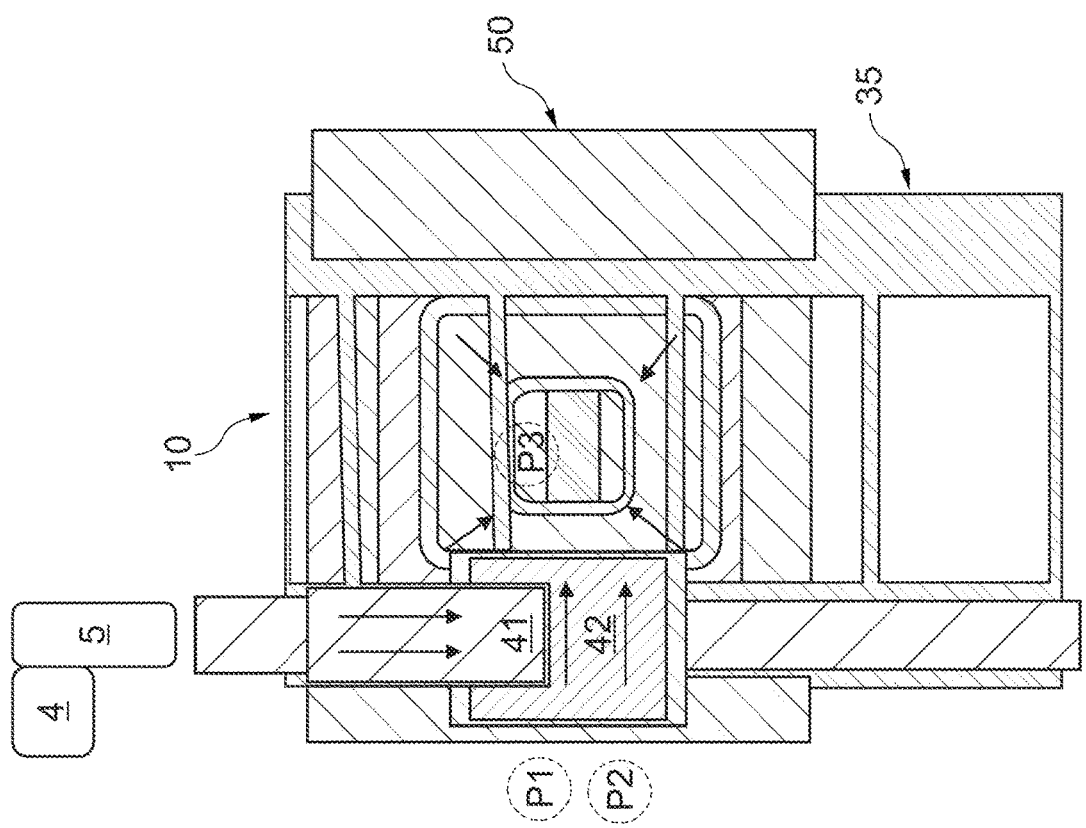

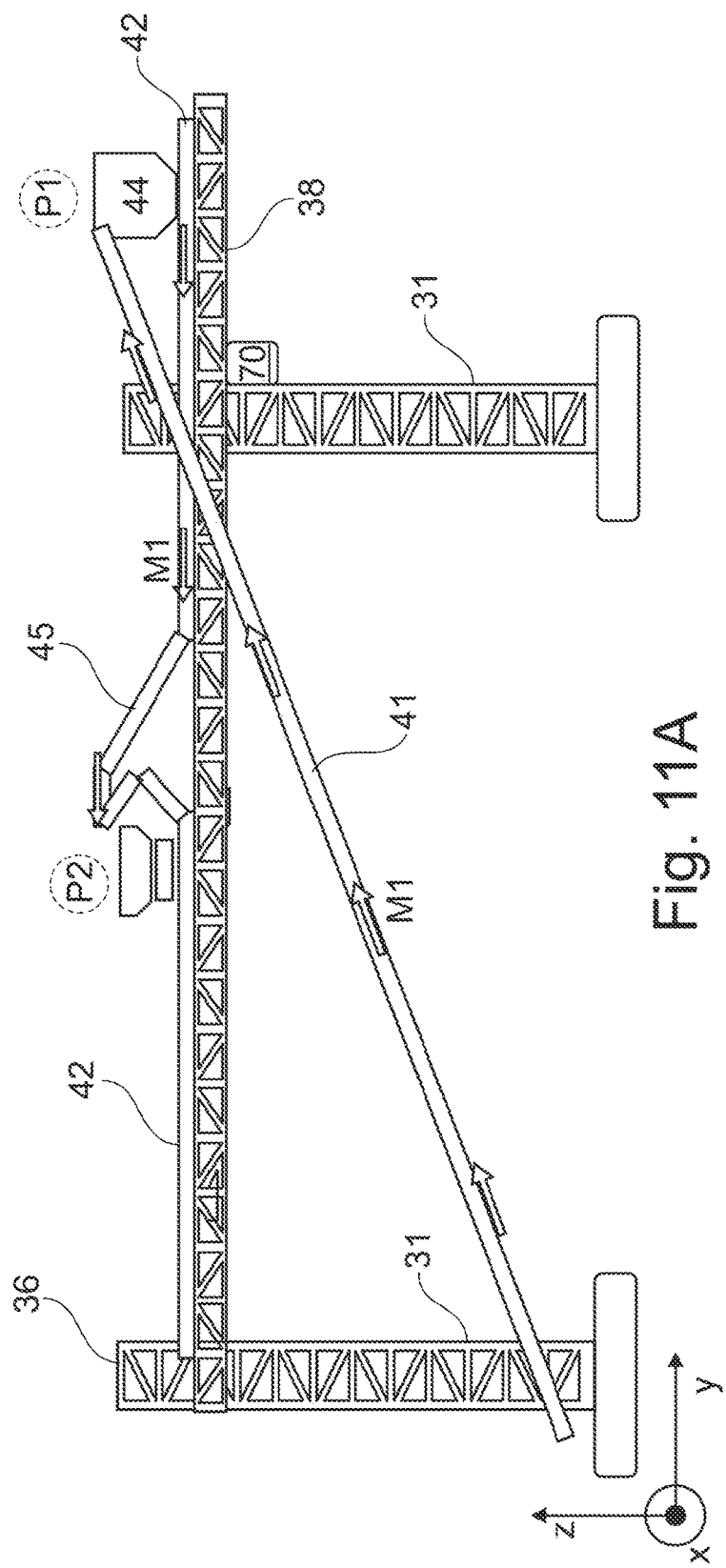
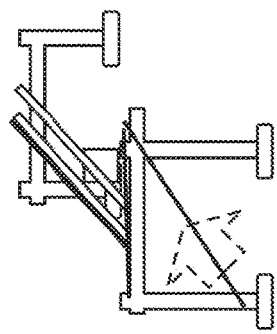
Fig. 11A
Fig. 11B

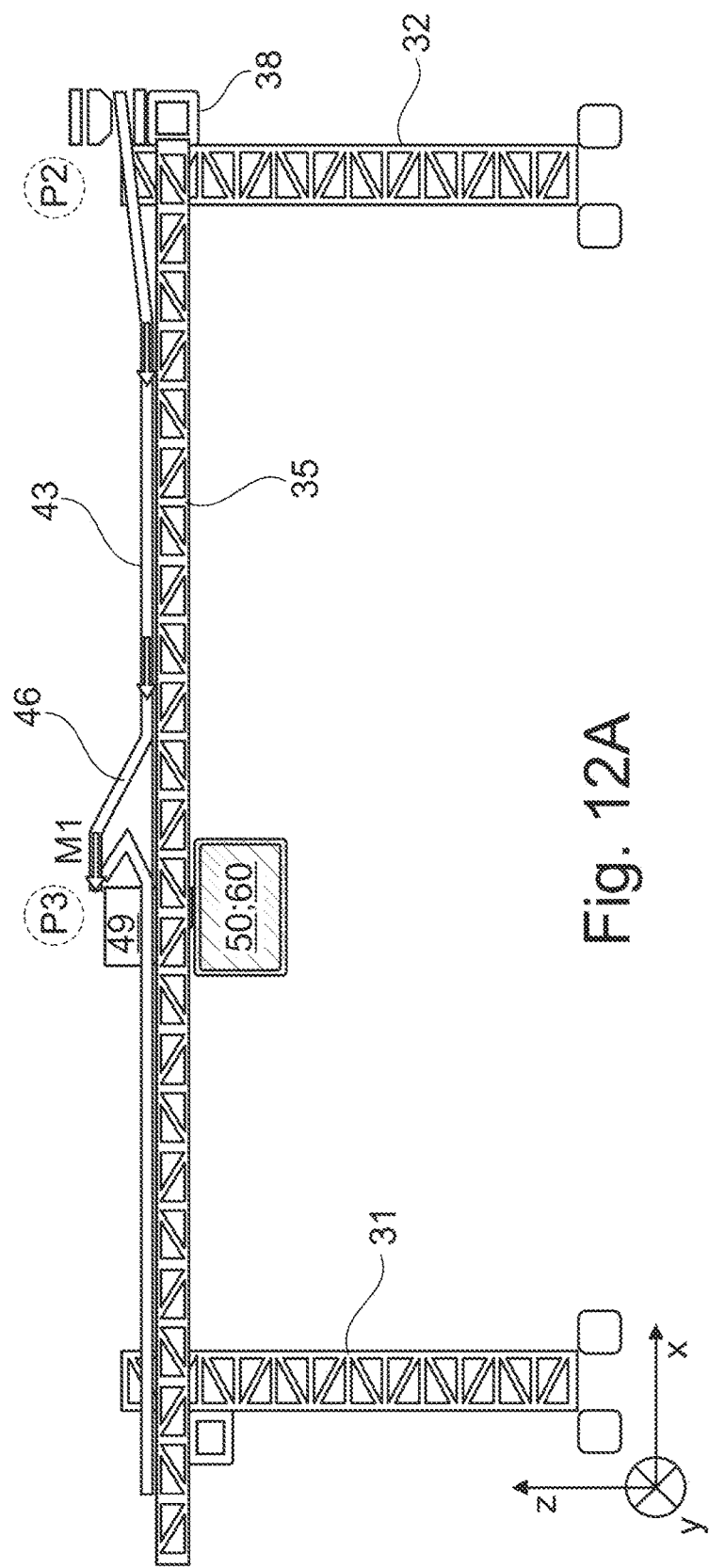
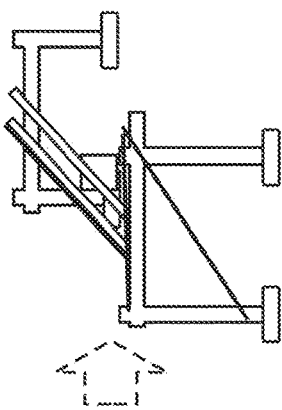
Fig. 12A
Fig. 12B

FEED MATERIAL PROCESSING DEVICE AND METHOD FOR APPLYING, DISTRIBUTING AND COMPACTING FEED MATERIAL IN DEFINED LAYER HEIGHTS

CROSS REFERENCE TO RELATED APPLICATIONS

This application is a U.S. National Stage Entry of International Patent Application Serial Number PCT/EP2020/052699, filed Feb. 4, 2020, which claims priority to German Patent Application No. DE 10 2019 201 906.4, filed Feb. 14, 2019, the entire contents of both of which are incorporated herein by reference.

FIELD

The present disclosure generally relates to methods and apparatuses for depositing, distributing, and compacting material in definable layer heights, including for embankment or levee construction.

BACKGROUND

For a variety of earthworks, it is necessary to bank up feedstock in accordance with specified profiles. This requirement arises in particular in levee construction. In order to be able to guarantee the required strength in the banked-up feedstock over a long period of time, the respective profile or material cannot/must not be banked up completely all at once (i.e. not above the desired final height or target height), but in many usage situations or in the case of many earthworks projects has to be applied in individual stages, experience having shown that the feedstock must then be compacted after each stage. Only in this way can the desired stability or a specified compaction action and thus the desired strength and force of resistance, e.g. against water pressure, be achieved.

Usage examples for such earthworks, in which the compaction/density of the feedstock is of great importance, are embankment and levee construction, or else the construction of highways and railroad lines, which in many cases are erected on banked-up and compacted embankments.

In particular, there is interest in a particularly time-efficient and as far as possible also at least partially automated construction of embankments (e.g. levees, road embankments, railroad track embankments) or other earthworks. Especially in levee construction, the time windows available for repairs or new construction are very narrow (keywords: nature conservation, flood protection, wind or storm surge risk).

Until now, levees and embankments have been erected using construction machines, which are if anything not very efficient, and which also can be automated only to a limited extent, with the result that a lot of time and work has to be expended for the respective construction. Examples of machines used until now: tracked paver with an output of e.g. 1500 t/h of feedstock at a rate of e.g. 20 m/min and a processing width of e.g. 12 m to 15 m; or: single-drum vibratory roller with padfoot drum for cohesive material or single-drum vibratory roller with smooth drum for non-cohesive material. For the material flow, it is possible to use e.g. height-adjustable material chutes or technologies used when loading ships with bulk goods.

There is interest in making earthworks or other works with a comparably high material throughput more time- and cost-efficient and as far as possible also automating them to a certain degree.

Thus a need exists to provide an apparatus and a method which have the features described at the outset, with which the creation of in particular large-scale construction works can be simplified and as far as possible also made particularly time-efficient, in particular when using feedstock in the form of bulk goods. A need also exists for a time-efficient material deposition in defined layer thicknesses, in particular in embankment or levee construction.

BRIEF DESCRIPTION OF THE FIGURES

FIG. 2A is a plan view of a material distributing device of a feedstock processing apparatus.

FIG. 2B is another plan view of the material distributing device.

FIGS. 10A, 10B, 11A, 11B, 12A, 12B are three different perspectives (i.e., 2× side views, 1× plan view) of a feedstock processing apparatus according to a further exemplary embodiment.

DETAILED DESCRIPTION

Figure 1:
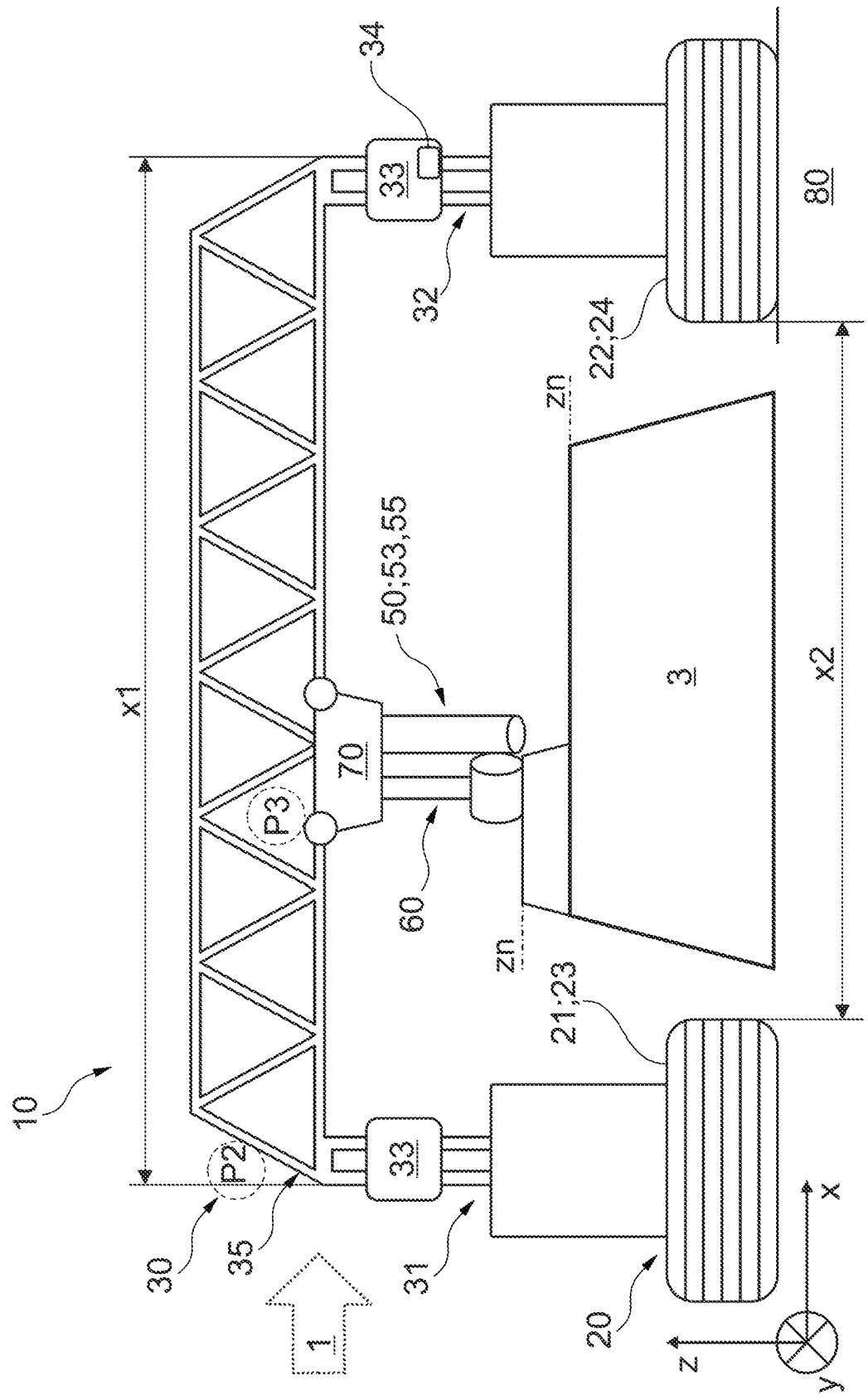
FIG. 1 is a side view of an assembly of a feedstock processing apparatus.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect of the present disclosure, a feedstock processing apparatus may be configured to deposit/apply, distribute and compact feedstock in defined/definable layer heights, in particular for embankment, levee and/or road construction, wherein the feedstock processing apparatus comprises: a chassis with at least one traction drive and at least one first and at least one second undercarriage, at least one of which is coupled to the at least one traction drive; a frame structure which connects the two undercarriages over a span width of the feedstock processing apparatus and provides a working width for the feedstock processing apparatus between the two undercarriages; a material feeding device coupled to the frame structure or supported thereon/therein; a material distributing device which is coupled to the material feeding device, can be displaced at least in certain sections over the span width, in particular in a central region thereof, is supported/mounted on the frame structure, and can be positioned at a multiplicity of application positions within the span width;

wherein the material distributing device is configured to deposit/apply the feedstock in layers on the soil in different, predefinable height positions between the two undercarriages, in particular for the purpose of creating an embankment/levee/underlying road surface, wherein the feedstock processing apparatus further comprises: a control device configured to activate the material distributing device, in particular configured to set the layer thickness of a feedstock applied in layers; a compacting device which is displaceably supported/mounted on the frame structure and/or on the material distributing device and is connected in terms of material flow to the material feeding device; wherein the control device is further configured to regulate a/the respective movement path of the compacting device and the material distributing device in a manner dependent on one another respectively within the working width. This not only provides advantages in terms of time, but also simplifies the material flow and logistics. Such an apparatus for depositing, distributing and compacting material in defined layer heights not least allows a very time-efficient process, even in the case of very bulky construction works.

In this way, the feedstock (cohesive to non-cohesive) can be applied in a defined layer thickness and compacted in the same process, in particular without time delays or at least without additional movement paths, in such a way that specified compaction values can be realized, in particular also in the narrowest possible tolerance range.

In this respect, the term "are connected in terms of material flow" means a relative arrangement such that the respective component is arranged and configured to act in the material flow or to support the material flow, in particular on the material flow path. In other words: the feedstock provided by the material distributing device is made available for the compacting device or processed at least by the compacting device, in particular directly during the application/distribution of the feedstock.

Here, the frame structure is to be understood as the aggregate of the constructional components which can guarantee the stability and arrangement of the apparatus, in particular including trusses, beams, members, framework structures, supports, arms or similar structural constructional components. In this respect, a frame structure can for example also be characterized by a single vertical support (tower-like assembly). Here, a frame structure may comprise both closed or symmetrical structures (keyword: gantry) and open or asymmetrical arrangements, e.g. a crane construction which is to be arranged laterally next to the construction works and has a supporting pillar and one or more trusses mounted thereon.

More than one material feeding device can also be provided here (at least one material feeding device).

The compacting device and the material distributing device can be displaced in a manner dependent on one another respectively along a predefinable movement path, in particular in such a way that the same batch of feedstock is handled both by the material distributing device and by the compacting device. Even in the case of a continuous process with a continuous material flow, reference can be made here to a batch, in particular in the sense that the material distributing device and the compacting device together provide and process a predefined horizontal section, specifically by means of a batch of material provided continuously or discontinuously with respect to a time window.

A gantry assembly with a frame structure that completely spans the construction works to be erected is advantageous in particular in levee construction, but is not necessarily required. The object defined above can therefore also be achieved by a feedstock processing apparatus configured to deposit/apply, distribute and compact feedstock in defined/definable layer heights, in particular for embankment, levee and/or road construction, wherein the feedstock processing apparatus comprises: a chassis with at least one traction drive and at least one undercarriage; a frame structure which provides a working width for the feedstock processing apparatus; a material feeding device coupled to the frame structure or supported thereon/therein; a material distributing device which is coupled to the material feeding device, can be displaced at least in certain sections over the working width, in particular in a central region thereof, is supported/mounted on the frame structure, and can be positioned at a multiplicity of application positions within the working width; wherein the material distributing device is configured to deposit/apply the feedstock in layers on the soil in different, predefinable height positions within the working width, in particular for the purpose of creating an embankment/levee/underlying road surface, wherein the feedstock processing apparatus further comprises: a control device configured to activate the material distributing device, in particular configured to set the layer thickness of a feedstock applied in layers; a compacting device which is displaceably supported/mounted on the frame structure and/or on the material distributing device and is connected in terms of material flow to the material feeding device; wherein the control device is further configured to regulate a/the respective movement path of the compacting device and the material distributing device in a manner dependent on one another respectively within the working width. This also favors e.g. an application in the case of construction works that are only accessible from one side.

It is optionally the case here that the undercarriage can be a constituent part of a chassis comprising at least one first and at least one second undercarriage, wherein the frame structure is supported on the first and second undercarriage and defines a span width of the feedstock processing apparatus and provides between the undercarriages a working width for the material distributing device and the compacting device, which can each be displaced on the frame structure within the working width.

The apparatus according to the invention may be used in a wide variety of efficient ways for different earthworks without a long training period for the erection process being required. A high degree of occupational safety can also be realized here, in particular by virtue of minimized traffic on the construction site or by virtue of a more centralized material flow. Not least, the planning and documentation of the construction progress can also be facilitated, in particular by virtue of integrated sensor systems and measurement technology e.g. in terms of spatially resolved material use/material consumption.

It has been shown that, by means of the apparatus according to the invention, many individual, previously required work steps can be integrated into one process, in particular into an integral process for erecting the entire levee or embankment or barrier.

It has been shown that, by means of the apparatus according to the invention, the feedstock (cohesive to non-cohesive) can be precisely and at the same time also efficiently applied in a defined layer thickness and compacted in such a way that specified compaction values can be reproduced and realized in a narrow tolerance range, in particular in a combined work step or in an integrated process.

The type of construction according to the invention not least also enables a high variability or flexibility of the process in terms of the geometry to be created of the barrier or the bank or the material accumulation (e.g. embankment). For example, even in the case of very disadvantageous space availability at the erection site, the invention therefore provides advantages in terms of the procedural options and in terms of the utilization of the available space.

Until now, compaction rollers have been used for earthworks or in road construction, but without a feed of feedstock and/or the distribution of the feedstock also being possible in the process.

Used in particular in road construction, independently of the work step of compacting, are what are known as screeds, which can distribute the feedstock over the working width, in particular by means of conveying screws, and possibly partially also precompact it. In this respect, the subsequent use of separate compacting rollers as independent construction machines for subsequent compaction was, however, still necessary up to now.

There is time pressure, in particular in levee construction: levees cannot be erected or maintained/renewed e.g. during the times of year with an increased risk of strong wind, storm surges or river flooding. In many regions, account must additionally be taken of severe time restrictions due to environmental protection regulations (keywords: breeding seasons, amphibian migrations). Especially in levee construction, the present invention allows a time- and resource-efficient procedure, in particular since at least two process steps that usually have to be carried out separately can be carried out together, in particular with the same movement, in particular on the same movement path, in particular simultaneously in a continuous manner.

Levees are comparatively complex earthworks in which in many cases a multiplicity of different feedstocks have to be placed and have to be compacted in predefined density ranges. Although there are also levees that have a homogeneous material composition at least in certain portions, these levees are rather less able to bear high loads and are therefore not intended for areas at particularly high risk. A levee is usually divided into at least four zones of different composition and/or different density. In the case of levee construction activities, a distinction can be made between the new construction of levees and levee reinforcement. In the new construction of levees, the levee is optimally built lengthwise; this usually takes place in at least six successive phases (I clearance and removal of obstacles; II preparation of the underlying surface; III removal/excavation of soil and leveling of the soil; IV first diking and banking-up, including at least one first compaction, in particular in at least four successive stages, each with banking-up and compaction; V application of at least one surface layer, optionally including at least one further compaction; VI lining/covering of the levee, in particular on the water side), each with a corresponding time outlay and with organizational outlay in terms of the sequence of the individual work steps. In the case of more frequently or regularly required levee reinforcement, parts of the old levee must be included in the construction activity. For this purpose, it is necessary for construction machines available up to now to disadvantageously create e.g. an opening through the levee, in particular in order to gain access to the levee on both sides for the construction activity. Levee outages of this type entail high risks and require, e.g. in terms of strong wind or high flood levels, strict and complex safety measures, e.g. in terms of a sufficient buffer of feedstock. The invention makes it possible to overcome these disadvantages in a simple and pragmatic manner.

According to the invention, previously known systems or working methods, in particular at least the banking-up of feedstock on the one hand and the compaction of the feedstock on the other hand, can now be combined with one another. In particular in the fourth phase in levee construction (diking and banking-up and compaction), technical effort and time can be saved in this respect.

Components according to the invention of the apparatus can also be described as follows. A feedstock processing apparatus comprises in particular: a frame structure or support structure configured to support and/or connect all the components or subsystems of the apparatus; a material feeding device configured to feed the feedstock to the treatment/processing point; a material distributing device configured to distribute the feedstock over a/the predefinable or settable working width; a control device configured to set layer heights of the processed/applied/layered feedstock, and optionally further configured to precompact the layered feedstock (for example by means of a tamper/rammer/soil compactor); at least one compacting device; a control device configured to activate at least one compacting unit, in particular to steer and/or align or pivot the compacting unit, or configured to regulate the compaction process.

In this respect, the control device comprises position, temperature, pressure, flow rate, humidity sensors, for example, and is configured to perform regulation with respect to the respective measurement parameter, in particular in order to be able to move the respective device synchronously with the material feed and/or to be able to compensate deviations in the trajectory (movement path), for example due to an offset on an inclined slope.

A/the mode of operation of the apparatus is described below by way of example:

The feedstock is distributed via a/the material distributing device onto the desired working width and is deposited by the controllable or regulatable material distributing device in the predefined desired placement height or layer thickness. In this case, precompaction may optionally also already be carried out, in particular by what is known as a tamper (e.g. in road construction), and/or by at least one pressure bar. A pressure bar allows only a comparatively low degree of compaction, but provides the advantage that the feedstock can be deposited in a very smooth or even/flat manner.

The feedstock deposited in a defined layer height is then compacted by a/the compacting device, preferably by means of at least one compaction roller (compacting unit). The compacting device is preferably designed as self-propelled; the compacting device preferably has at least one propulsion means (traction drive).

At least one compacting unit can be aligned and/or oriented and/or rotated by at least one steering device, in particular in order to be able to drive around curves and trajectories or to correct the movement path. It has been shown that advantageously two compacting units in the form of compaction rollers are used, both of which can be oriented/adjusted/steered at an angle to the support structure, in particular also in order to be able to realize crab steering (kinetics synchronized with respect to rotational movement). This also makes it possible to position the distributing unit in such a way that the newly applied layer optimally can be in close contact with the previously applied layer or can join therewith.

In the case of crab steering, both the front wheels and the rear wheels are deflected in the same direction, wherein an offset of the track can also be made possible when driving straight ahead. This respectively reduces disadvantageous effects with respect to the formation of ruts and also makes it possible to stabilize the vehicle or the apparatus. Crab steering can also optionally be set when the intention is to minimize the compression loading on a case-by-case basis or in certain sections. Not least, this makes it possible to use uniform compacting units also for different feedstocks or different pressure setpoint values.

The frame structure may provide e.g. guides, in particular rails, for conveying units. The frame structure may further provide mounts and supports for the material flow from the soil to the material distributing unit. In this respect, the frame structure preferably makes it possible to provide a support on the soil on both sides of the construction works to be erected, that is to say in an arrangement that completely spans the construction works.

The feedstock to be placed is transported to a first material transfer point by means of at least one material conveying device, preferably at least one conveyor belt. From there the material, in particular after a change in the material flow direction, will be transported further by means of at least one further material conveying device to a movable material distributing device (placement unit) and be removed from the material conveying unit there. That material conveying unit which further transports the material from the transfer point is preferably at least simply length-adjustable.

In the placement unit, the material to be placed is distributed over the desired working width and applied by the distributing device in a predefinable, regulatable or controllable placement height (layer thickness). Precompaction by a tamper (cf. road paver) may optionally also already take place here.

The material deposited in a defined layer height is then compacted by a compacting device, preferably a compaction roller. The material distributing device can be controlled and steered in such a way that any deviations in the running direction (movement path) can be corrected, in particular also to realize optionally curved trajectories. The material distributing device can in particular operate bidirectionally in two directions, wherein preferably two compacting units are provided, one upstream and one downstream of the material distributing device. A height adjusting means of the material distributing device makes it possible to set the desired working height, for example when renovating a levee. The entire system can move independently and in the process compensate inclinations and height differences by way of an optional height compensating apparatus.

A profile with a wide variety of parameters can be specified for the apparatus via an input device. Recorded measurement results from sensors are used to document the material placed and the respective compaction parameters and values, in particular respectively spatially resolved.

According to one exemplary embodiment, the compacting device or at least one compacting unit of the compacting device is mounted rotatably, in particular around a height axis or around an axis of rotation inclined at an angle of less than 45° to the height axis, and wherein the control device is further configured to set a steering deflection or a rotational angle of the at least one compacting unit around the corresponding height axis/axis of rotation. In this way, in addition to horizontal planes/strips created in a time-efficient manner, also inclined lateral surfaces of the construction works can be created or the application and compaction can take place on curved movement paths, for example in a continuous manner at direction change points (points of reversal for the displacement of the material distributing/compacting device).

According to one exemplary embodiment, the compacting device or at least one compacting unit of the compacting device is mounted in a height-adjustable manner (adjustable with respect to the height direction), and wherein the control device is further configured to set the height position or additionally also an inclination of the at least one compacting unit. In this way, the manner of compaction can also be finely adjusted, e.g. in terms of the density of the applied material, in particular before the material is compacted.

According to one exemplary embodiment, the compacting device has at least one or at least two compacting units respectively in the form of a drum or roller with at least one rolling axis, in particular respectively in an articulated mount configured to align the compacting units for crab steering. This also makes it possible to promote a good connection between the individual layers.

According to one exemplary embodiment, the compacting device has at least one compacting unit, which can be inclined about an axis of inclination relative to the horizontal plane. This promotes e.g. the compaction of inclined surfaces, in particular in levee construction.

According to one exemplary embodiment, the compacting device and/or the material distributing device can each be displaced without contact with the soil, in particular in a suspended arrangement on traction means suspended on the frame structure, in particular in a height-adjustable manner via at least one winch. This also allows great freedom of movement.

According to one exemplary embodiment, the compacting device has a drive configured for the autonomous propulsion (self-propelling) of the compacting device. This also makes it possible to minimize the forces acting on the frame structure and to effectively transfer the propulsive forces. In this respect, the drive can act e.g. on an axle of a respective compacting unit of the compacting device.

According to one exemplary embodiment, the material distributing device is configured to distribute the feedstock over the entire working width, in particular respectively in the predefinable height positions, in particular over a height of at least a few meters, in particular at least five or ten meters.

According to one exemplary embodiment, the material distributing device and the compacting device are configured to distribute and compact the feedstock in/on horizontal strips with a predefinable longitudinal extent (cross-sectional width). This facilitates a systematic grid-like, matrix-like procedure; the process can be carried out in a particularly efficient manner. The feedstock processing apparatus can be configured to apply, distribute and compact the feedstock in horizontal strips which are created in a row one after another in the propulsion direction over the working width, in particular with a respective translational displacement of the material distributing device and compacting device exclusively in the width direction, in particular with a matrix-like movement path with graduated displacement of the undercarriage(s) in the propulsion direction. This also promotes the support in terms of significant forces of inertia and reaction moments. In particular, displacement in only one direction (one-dimensional) can in this respect allow comparatively quick displacement and an efficient process.

According to one exemplary embodiment, the compacting device has at least two compacting units, which can be positioned or aligned relative to one another in such a way that the movement path(s) of the compacting device represent crab steering.

According to one exemplary embodiment, the material distributing device and the compacting device can be positioned in a multiplicity of height positions over a height of at least 5 m or at least 10 m, in particular respectively in relative height positions in a manner dependent on one another or at a predefinable distance in terms of height from one another.

According to one exemplary embodiment, the span width is at least 35 m or at least 55 m; and/or wherein the first and second undercarriage respectively laterally outwardly delimit the working width; and/or wherein the feedstock processing apparatus defines/has a working width which is at least 50% or at least 75% of the span width of the feedstock processing apparatus, in particular at least 50 m. This promotes the handling of a large amount of material (maximized material throughput) even when the available space is confined.

Exemplary material throughputs are e.g. in the range from 600 to 1500 t/h [tonnes per hour]. The specifically realizable material throughput can also depend on the compactability of the feedstocks, or on the requirements for the compaction values depending on the field of use (embankment construction, road construction, noise protection barrier).

Exemplary time windows for construction of an embankment with a height of 5 m to 10 m, with respect to the respective longitudinal section of the embankment that can be spanned, in particular before the traction drive should generate further propulsion: for each longitudinal section spanned by the apparatus, e.g. in the region of about an hour.

For example, at a friction angle of approx. 30° (angle of internal friction below which solid bodies or a loose fill can be subjected to load without having to accommodate a high risk of slipping) and a travel distance of 20 m (exemplary translational degree of freedom of movement of the apparatus without it being necessary to generate propulsion in the undercarriage), a material requirement of approx. 1300 m$^3$ must be allowed for. At a specific weight of sand (approx. 1.2 to 1.4 t/m$^3$), a mass of approx. 1700 tonnes must be allowed for. According to the invention, about 1 to 1.2 hours of time, for example, should be scheduled for this in that case. After this time window, the apparatus can be moved into the next longitudinal position by the propulsion in order to create a further longitudinal section of the embankment.

According to one exemplary embodiment, the frame structure has at least one longitudinal member which extends at least approximately in the advancement direction of the traction drive and extends over a length corresponding to a multiple of an individual horizontal strip to be created of the construction works to be created or over a length corresponding to a multiple of the longitudinal extent of a/the crossmember of the frame structure that mounts the material distributing device and the compacting device. This favors the creation of individual horizontal sections of the construction works without the frame structure having to be displaced relative to the soil in the process. This also provides high stability even in the case of considerably large moved masses.

According to one exemplary embodiment, the working width of the feedstock processing apparatus can be set, in particular by means of a translational guide formed on the frame structure; and/or wherein the feedstock processing apparatus is configured to create earthworks by means of the feedstock with a triangular or trapezoidal cross-sectional geometry.

According to one exemplary embodiment, the feedstock processing apparatus is designed symmetrically with respect to the working/propulsion direction, in particular with two supports which are to be arranged/are arranged to the side of the working width opposite one another in each case, in particular each support having an undercarriage. This also makes it possible to promote good utilization of the available space, in particular over the entire span width (maximum working width).

According to one exemplary embodiment, the frame structure has a modular design, in particular in the form of connectable constructions with a multiplicity of connectable frame elements, in particular in the form of a steel construction, in particular with a framework structure. This also simplifies the adaptation of the apparatus to the size and geometry of the construction works to be erected.

According to one exemplary embodiment, the feedstock processing apparatus defines at least three material transfer points on the material flow path defined by the feedstock processing apparatus from a delivering material transport unit (e.g. truck) to the application point defined by the material distributing unit, in particular a first material transfer point from a first, in particular continuously conveying, conveying device to a second, in particular continuously conveying, conveying device, a second material transfer point from the second conveying device to a third, in particular continuously conveying, conveying device, and a third material transfer point from the third conveying device to the material distributing unit/material distributing device. The extent to which the material is then deposited continuously or discontinuously at the application point can be set individually by means of the material distributing device. The feedstock is preferably deposited continuously with a continuous translational displacement of the material distributing device.

The conveying devices may in particular each be designed as continuously conveying and regulatable conveyor belts. A respective conveying unit may be arranged in the material transfer points. A reorientation or realignment of the material flow direction may respectively also take place in the material transfer points. This allows comparatively high transport speeds in as far as possible only a single direction, that is to say with minimized forces of inertia. In this respect, the material flow path can begin at a delivering material transport unit (of a different system) (e.g. truck), in particular by transferring the feedstock to the first conveying device in batches.

The conveying devices may in particular be designed in accordance with at least one of the following designs or be installed in a corresponding configuration:
conveying device/conveyor belt runs on the frame structure or is guided along the frame structure on top of the frame structure;
crossmember is suspended under the frame structure, clasps the frame structure like a trolley or like a rollercoaster, for example;
crossmember runs next to the frame structure.

The material transfer is preferably carried out respectively by means of steplessly movable transfer devices/conveying units (e.g. tripper car, deflector, rotating disk).

According to one variant, movable crossmembers are completely dispensed with, in particular with regard to as few as possible moved parts. As an alternative, at least one movable crossmember can optionally be provided, depending on requirements and the specific application.

The object mentioned above is also achieved according to the invention by a method for depositing/applying, distributing and compacting feedstock in defined/definable layer heights, in particular for embankment, levee and/or road construction, in particular by means of a feedstock processing apparatus described above, wherein the feedstock is conveyed by means of a material feeding device at least in certain sections along a frame structure extending over a/the span width of the feedstock processing apparatus; wherein the feedstock is applied to and distributed on the soil over a working width between at least two undercarriages by means of a material distributing device mounted displaceably on the frame structure, by positioning the material distributing device at a multiplicity of application positions or displacing said material distributing device along them; wherein the material distributing device for depositing/applying the feedstock in layers on the soil is positioned/displaced in/into different, predefinable height positions, in particular for creating an embankment/levee/underlying road surface within the working width between the at least two undercarriages, wherein the material distributing device and a compacting device are displaced in a manner dependent on one another along a/the respective movement path of the compacting device and the material distributing device in such a way that the feedstock is both applied and compacted layer by layer in the respective height positions within the working width between the at least two undercarriages. This results in the abovementioned advantages.

A gantry assembly with a frame structure that completely spans the construction works to be erected is advantageous in particular in levee construction, but is not necessarily required. The object defined above can therefore also be achieved by a method for depositing/applying, distributing and compacting feedstock in defined/definable layer heights, in particular for embankment, levee and/or road construction, in particular by means of a feedstock processing apparatus described above, wherein the feedstock is conveyed by means of a material feeding device at least in certain sections within a working width; wherein the feedstock is applied to and distributed on the soil within a working width by means of a material distributing device, by positioning the material distributing device at a multiplicity of application positions or displacing said material distributing device along them; wherein the material distributing device for depositing/applying the feedstock in layers on the soil is positioned/displaced in/into different, predefinable height positions, in particular for creating an embankment/levee/underlying road surface within the working width, wherein the material distributing device and a compacting device are displaced in a manner dependent on one another along a/the respective movement path of the compacting device and the material distributing device in such a way that the feedstock is both applied and compacted layer by layer in the respective height positions within the working width undercarriages.

Optionally, in the process the feedstock can both applied and compacted within the working width between at least one first and at least one second undercarriage, wherein the undercarriages support a frame structure which extends over a span width over the working width, and on which frame structure the material distributing device and the compacting device are positioned or displaced.

According to one embodiment, the feedstock is applied and compacted between at least two undercarriages, which respectively support the frame structure to the side of the working width, and optionally also below the frame structure, that is to say without an offset in the advancement direction.

According to one embodiment, the movement paths of the material distributing device and the compacting device are set as at least approximately symmetrically configured movement paths for a synchronous movement of the material distributing device and the compacting device over the working width, in particular for a movement guided purely translationally on the frame structure, in particular transversely (at least approximately orthogonally) to the advancement direction, that is to say transversely to the desired longitudinal extent of the construction works to be erected. This provides further synergies when coupling/integrating these two processes into a single work step.

According to one embodiment, the individual height levels of the construction works to be erected are created respectively in a plurality of horizontal strips one after another when propulsion is not occurring/the traction drive is at a standstill, in particular in a single predefined height level in at least four or five horizontal strips, in particular each with an offset in the advancement direction between the horizontal strips of adjacent height levels; and/or wherein the individual height levels of the construction works to be erected are created respectively in a plurality of horizontal strips one after another when propulsion is not occurring, wherein each horizontal strip is effected by a translational displacement of the material distributing device and the compacting device along a/the crossmember of the frame structure over the entire working width or over the target width of the constriction works, in particular by a single unidirectional translational displacement per horizontal strip, in particular by a one-dimensional displacement. This makes it possible to guarantee an efficient process even with comparatively large mass forces and forces of inertia.

A corresponding height level of the construction works to be erected can be created with respect to the advancement direction of the frame structure in a respective first phase in a plurality of horizontal strips one after another in the advancement direction (application and compaction), in particular with a predefined number of at least six to eight horizontal strips (with the number of horizontal strips in particular depending on the longitudinal extent of longitudinal members of the frame structure), and be created in a respective second phase in a subsequent longitudinal section analogously in terms of the height levels, in particular repeating the two steps until the desired target height of the construction works is reached, in particular in each case with an offset in the advancement direction between the horizontal strips of adjacent height levels, in particular when propulsion is not occurring.

According to one embodiment, a corresponding height level of the construction works to be erected is created with respect to the advancement direction of the frame structure in a respective first stage by a bidirectional translational displacement along the frame structure over the working width, in particular with an offset in the propulsion direction between the change in displacement direction, and is created in a respective second stage in the next height levels with an offset in the propulsion direction and respectively with a bidirectional translational displacement direction which is counter to the previously created height level, in particular repeating the two stages until the desired target height of the construction works is reached. This also allows good stability, e.g. when using rollers as compacting units. This also makes a particularly efficient method possible.

According to one embodiment, at least one material from the following group is used as feedstock: cohesive soils, silt, clay, bulk material, earth, stone material, sand, gravel, sand-gravel mixture, concrete, burrowing-animal protection material (in particular coarse, sharp-edged rubble), topsoil; and/or wherein a plurality of feedstocks are processed and applied in layers, in particular at least one first feedstock from the group of: cohesive soils, silt, clay, bulk material, earth, stone material, sand, gravel, sand-gravel mixture, concrete, burrowing-animal protection material, topsoil; and at least one second feedstock from the group of: cohesive soils, silt, clay, bulk material, earth, stone material, sand, gravel, sand-gravel mixture, concrete, burrowing-animal protection material, topsoil. Optionally, at least one additive can be/have been admixed with the feedstock. Metallic materials can also be admixed, for example, in particular in the context of a reinforcement or bracing or stiffening or strengthening or structuring of the feedstock. In this way, different degrees of hardness or force flow lines/areas can optionally also be generated/specified in the construction works to be created.

According to one embodiment, the feedstock is continuously transferred on the material flow path from the soil to the elevated material delivery point (defined by the material distributing device) at three material transfer points, specifically: at a first material transfer point between a (first) conveying device which conveys in the height direction and a (second) conveying device which conveys at least approximately horizontally along the frame structure, at a second material transfer point between the conveying device which conveys horizontally and a further (third) conveying device which conveys at least approximately horizontally along the frame structure, and at a third material transfer point from the further conveying device which conveys horizontally to the material distributing device. In this respect, the material transfer points can optionally also provide a buffer function, e.g. by means of bunkers arranged there. By virtue of the plurality of material transfer points, a continuous or virtually continuous material flow can be flexibly controlled and adapted to the construction progress, e.g. even in the event of fault states or a brief interruption to the application and compaction.

Here, the three material transfer points can all be/have been provided by the material feeding device. The material transfer is preferably carried out in a continuous manner.

According to one embodiment, the feedstock is applied, distributed and compacted (in particular in a meandering shape) in horizontal strips which are arranged in a row one after another in the propulsion direction over the working width, in particular on bidirectional movement paths in the width direction over the entire working width, in particular back and forth in an alternating manner. This also facilitates the systematization of the process and thus the traceability and documentation.

According to one embodiment, firstly in a first phase a first section of the embankment is erected over the entire target height of the embankment, in particular over at least four height levels or in at least four layers, and then in a second phase a further section is erected over the target height, in particular along the entire longitudinal extent of the feedstock processing apparatus, in particular with horizontal strips offset in relation to one another in the respective layers/height levels in the propulsion direction/longitudinal direction, in particular when propelled by means of a/the chassis exclusively between the phases.

According to the invention, the object mentioned above is also by a control device configured to carry out a method described above, wherein the control device is coupled at least to the material feeding device, to the material distributing device and to the compacting device, in particular a control device configured to regulate the material flow and the movement paths on at least the three components material feeding device, material distributing device and compacting device in a manner dependent on one another. This results in the abovementioned advantages.

The object mentioned above is also according to the invention by the use of a feedstock processing apparatus for applying, distributing and compacting feedstock in defined/definable layer heights, in particular a feedstock processing apparatus described above, for embankment, levee and/or road construction, wherein at least one compacting device and at least one material distributing device in a manner dependent on one another are activated and regulated in terms of position in such a way that the feedstock in the respective layer is both applied and compacted in a combined process on a regulated movement path of the material distributing device and the compacting device. This results in the abovementioned advantages.

The object mentioned above is also achieved according to the invention, in particular according to a second aspect of the present invention, by an apparatus described above, in which the material distributing device has at least one material distributing unit in the form of a 3D printing unit configured to apply the feedstock in layers in a ready-to-use state. According to this (second) aspect of the present invention, an independent method of the machine for the automated application and direct compaction of material in defined layers to generate a predefined profile (e.g. for the construction of an embankment) can be carried out, wherein the application is carried out specifically by means of at least one 3D printing unit, in particular by treating the feedstock during the application (not just dumping bulk material, but also material treatment, in particular in a continuous manner).

It is also the case with an arrangement of this type that a gantry assembly with a frame structure that completely spans the construction works to be erected is advantageous, but not necessarily required, in particular in levee construction.

According to one exemplary embodiment, the undercarriage can be a constituent part of a chassis comprising at least one first and at least one second undercarriage, wherein the frame structure is supported on the first and second undercarriage and defines a span width of the feedstock processing apparatus and provides between the undercarriages a working width for the material distributing device and the compacting device, which can each be displaced on the frame structure within the working width. In this way, an originally one-sided configuration can be converted into a gantry configuration, in a manner analogous to the modification, already described above, according to the first aspect.

According to one exemplary embodiment, the at least one 3D printing unit has a temperature controlling unit and/or a pressure generating unit. This makes it possible for an optional material (post)treatment to take place, depending on the type of feedstock used. This also makes it possible to promote a compacting process.

A temperature controlling unit and/or a pressure generating unit can also be provided independently of a 3D printing unit.

The compactability of the feedstocks depends e.g. on the water content. The temperature may optionally be controlled e.g. in connection with construction works which must take place at times when the outdoor temperatures are in the region of the freezing point. The temperature of the feedstock can then be preliminarily controlled. This makes it possible e.g. also to facilitate the erection of construction works at critical times, e.g. in an emergency in disaster situations or to avert storm surges in winter.

According to one exemplary embodiment, the at least one 3D printing unit has a feed for additives or additional supplemental material, in particular a mixer. This makes it possible to set further process parameters.

A feed for additives can also be provided independently of a 3D printing unit.

Water can be added, for example. The feeding device for additives can optionally also have at least one nozzle and be coupled to the material flow path, in particular upstream of the compacting unit.

The object mentioned above is also achieved according to the invention, in particular according to a second aspect of the present invention, by a method described above in which the feedstock is applied by means of at least one material distributing unit in the form of a 3D printing unit, in particular by applying and compacting a respective layer additively by means of the feedstock or a mixture of at least two feedstocks and optionally by means of at least one additive. This results in the abovementioned advantages. In this respect, e.g. at least one additive manufacturing process in accordance with the processes defined/standardized in the standard/guideline VDI 3405 ("Additive manufacturing processes—Basics, definitions, process descriptions") can be used.

A gantry assembly with a frame structure that completely spans the construction works to be erected is advantageous in particular in levee construction, but is not necessarily required. The object defined above can therefore also be achieved by a method for depositing/applying, distributing and compacting feedstock in defined/definable layer heights, in particular for embankment, levee and/or road construction, in particular by means of a feedstock processing apparatus described above, wherein the feedstock is conveyed by means of a material feeding device at least in certain sections within a working width; wherein the feedstock is applied to and distributed on the soil within the working width by means of a material distributing device, by positioning the material distributing device at a multiplicity of application positions or displacing said material distributing device along them; wherein the material distributing device for depositing/applying the feedstock in layers on the soil is positioned/displaced in/into different, predefinable height positions, in particular for creating an embankment/levee/underlying road surface within the working width, wherein the material distributing device and a compacting device are displaced in a manner dependent on one another along a/the respective movement path of the compacting device and the material distributing device in such a way that the feedstock is both applied and compacted layer by layer in the respective height positions within the working width undercarriages, wherein the feedstock is applied by means of at least one material distributing unit in the form of a 3D printing unit, in particular by a respective layer being applied and compacted additively by means of the feedstock or a mixture of at least two feedstocks and optionally by means of at least one additive.

Optionally, in the process the feedstock can be both applied and compacted within the working width between at least one first and at least one second undercarriage, wherein the undercarriages support a frame structure which extends over a span width over the working width, and on which frame structure the material distributing device and the compacting device are positioned or displaced.

According to one embodiment, the feedstock is applied by means of the at least one material distributing unit in the form of a 3D printing unit by the feedstock continuously being fed to the 3D printing unit at an at least approximately constant material throughput. In this way, time synergies can also be achieved in terms of the creation of large areas with a translational, continuous displacement on the frame structure.

According to one embodiment, the feedstock is applied in a compacted manner by means of the at least one material distributing unit in the form of a 3D printing unit in such a way that the feedstock is subjected to a second compaction by means of the compacting device. By virtue of the 3D printing unit, the feedstock can be applied in a precompacted state, for example also by the addition of additives or additional supplemental material. Consequently, on the one hand a very efficient material flow, in particular based on bulk goods, can be guaranteed, in particular at a high throughput, and on the other hand the bulk goods can be applied and compacted with regard to individual requirements of the construction works to be erected. The 3D printing unit allows method variations and can also be used in combination with at least one conventional (non-printing, non-additively applying) material distributing unit.

According to one embodiment, the material distributing unit (such as a 3D printing unit) is activated in such a way that the feedstock is built up layer by layer, with a first layer forming a base or support structure for a further layer built up thereon. Not least, this also opens up method combinations with the application of bulk materials.

According to one embodiment, the applied feedstock is precompacted during the application by the 3D printing unit performing a thermal and/or pressure treatment. Pressure treatment is to be understood here preferably as meaning a pressure treatment by means of fluids, that is to say not by mechanical pressure. This makes it possible to further individualize the feedstock or a mixture of a plurality of feedstocks with regard to the desired function of the respective section of the construction works. In levee construction, for example, the flank facing the water and the flank facing away from the water fulfill different functions and, if appropriate, should also have a different structure or strength such that, by virtue of a combination of a plurality of different types of material distributing units in one material distributing device, a multiplicity of process variations are opened up.

According to one embodiment, the feedstock applied by means of a 3D printing unit is compacted in such a way that a further height level/layer can be produced directly on the applied layer (in particular without it being necessary to adhere to cooling or solidifying times). This makes it possible to guarantee further advantages in terms of time.

The object mentioned above is also according to the invention by a control device described above which is configured to set the material throughput for the application by 3D printing. This results in the abovementioned advantages.

The object mentioned above is also according to the invention by using a feedstock processing apparatus for applying, distributing and compacting feedstock in defined/definable layer heights, in particular a feedstock processing apparatus described above, for embankment, levee and/or road construction, wherein at least one compacting device and at least one material distributing device in a manner dependent on one another are activated and regulated in terms of position in such a way that the feedstock in the respective layer is both applied and compacted in a combined process on a regulated movement path of the material distributing device and the compacting device, wherein the feedstock is applied in the individual layers by means of at least one material distributing unit of the material distributing device in the form of a 3D printing unit. This results in the abovementioned advantages.

For the purpose of easier understanding, the figures are first described together with reference to all the reference signs. Details or special features shown in the respective figures are described individually.

To erect an embankment or levee or construction works 3 on the soil 80, feedstock 1, which is preferably applied and compacted in individual horizontal strips 2, is used. The construction works is then produced in individual horizontal sections 3.1, 3.2, . . . , 3.12, 3.*n*, in particular in e.g. five or six horizontal sections per height level zn (here, six horizontal sections per level).

Firstly, the feedstock has to arrive at the construction site. Material transport units, in particular trucks 4, can be used for this purpose (in particular delivery in batches). By means of a material feeding unit 5, in particular a tripper car, the feedstock can then be fed to a/the feedstock processing apparatus 10 for processing.

The feedstock processing apparatus 10 comprises a chassis 20 with at least one undercarriage, in particular with a first undercarriage 21, in particular a tracked undercarriage, and a further (second) undercarriage 22, in particular a tracked undercarriage. Several (first, second) traction drives 23, 24 may be provided, each for one of the undercarriages. A frame structure 30 with at least one support, in particular with a first support 31, in particular in a vertical alignment, and with at least one further (second) support 32, in particular in a vertical alignment, preferably each having a height adjusting means 33 with an in particular hydraulic drive/actuator 34, provides a support for a crossmember 35 (support structure or component thereof), on which at least one tool/device is displaceably mounted via fastening means 37, in particular for a translational relative movement. In this respect, the frame structure 30 may be designed in a modular manner from individual modular frame elements 36. The frame structure 30 may further have one or more longitudinal members 38. One or more guides 39, in particular translational guides, may be provided on the frame structure 30, in particular also for the purpose of mounting material flow modules.

A material feeding device 40 guarantees the material flow from the material transport units 4 up to the application point and, in one of the exemplary embodiments shown here, comprises a first, second and third conveying device 41, 42, 43, in particular each in the form of a conveyor belt, and a first, second and third conveying unit 44, 45, 46, in particular in the form of a trolley or tripper car. A further conveying unit 47 may be designed in particular as a screw conveyor and be provided for the material flow at the application point. A height-adjustable material chute 48 may also be provided.

A material distributing device 50 guarantees the distribution of the material at the application site and comprises at least one winch 51 and traction means 52 as well as a material distributing unit 53, in particular in the form of or having a 3D printing unit 55. An alignment of the compacting units can be set, optimized or else cyclically continuously adjusted by means of a rotary mechanism 54 (keyword: crab steering). Control steps for crab steering are illustrated e.g. in FIG. 13 (in particular S23, S31, S32, S33, S41).

A compacting device 60 guarantees the compaction of the material, in particular directly at the application point or just upstream and/or downstream thereof, and comprises a rotary drive 61 or a steering device, at least one compacting unit 63, in particular in the form of a vibratory roller or compaction roller, a grader 65 and at least one drive 66 for autonomous propulsion of the compacting device.

A control device 70 for controlling/regulating the method is coupled to at least one sensor 71 and comprises a material flow control unit 73 and is configured to activate at least one joint 75 arranged on the material flow path or the corresponding pivot axis.

The material transfer may take place in particular in three transfer points, in particular with a continuous material flow in each case: first material transfer point P1, second material transfer point P2, third material transfer point P3.

The method can be described by the following steps:
S0 Material flow from P1 to P3
S01 Material transfer in P1, in particular by way of continuous pouring
S02 Material transfer in P2, in particular by way of continuous pouring
S03 Material transfer in P3, in particular by way of continuous pouring
S04 Regulating the material throughput during the conveying
S10 Applying feedstock
S11 Regulating the material throughput when the feedstock is being applied
S20 Compacting feedstock
S21 Compacting upstream of the application point for feedstock
S22 Compacting downstream of the application point for feedstock
S23 Actuating, in particular driving/rotating, at least one compacting unit
S30 Propulsion of material distributing device and compacting device
S31 Propulsion in width direction
S32 Propulsion in working direction
S33 Setting the movement path of the compacting unit
S40 Height positioning and height adjustment
S41 Tilt compensation
S50 Setting the application direction and/or longitudinal offset
S60 Propulsion by chassis (traction drive) in the working direction
S61 Propulsion in accordance with the predefined longitudinal section of the construction works to be erected The length and size indications are explained below:
Width direction x, working direction or propulsion direction y, height or height direction z (in particular vertical or direction of gravity). The span width x1 of the apparatus is greater than the working width x2 of the apparatus. The length y1 of the apparatus can be selected with regard to the construction works to be created. The longitudinal extent y2 of the material distributing device/material distributing unit makes it possible to define the width of horizontal strips which can be applied by means of the material distributing device.

FIGS. 2B, 3B, 4B, 10B, 11B, 12B respectively illustrate the perspective of the apparatuses shown in the corresponding FIGS. 2A, 3A, 4A, 10A, 11A, 12A.

Figure 7:
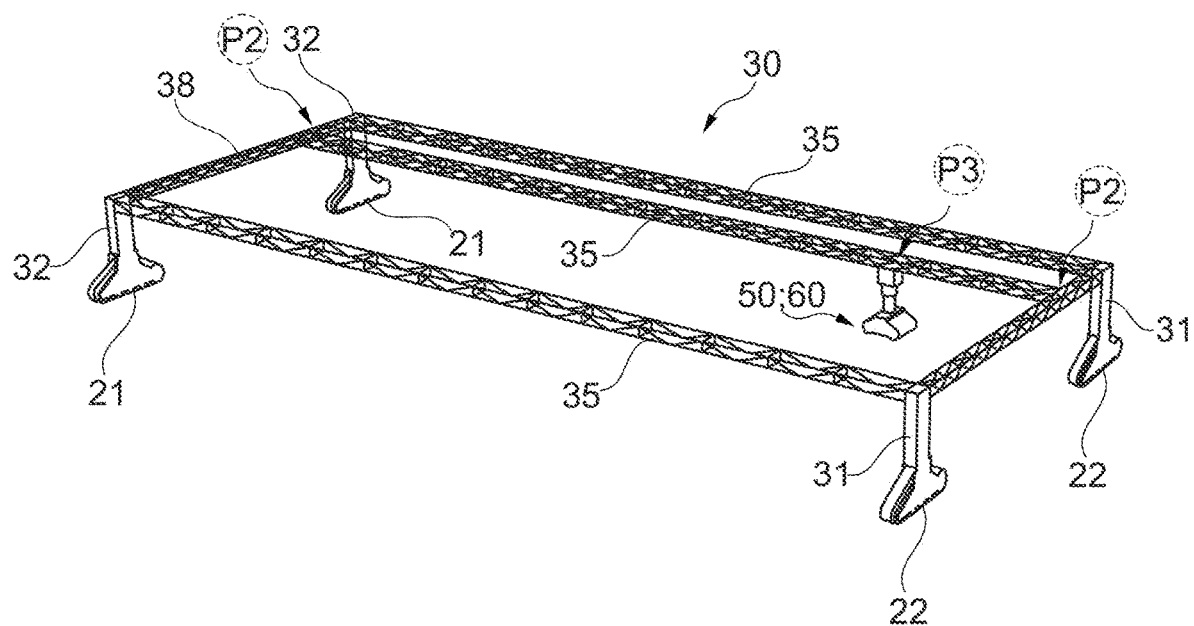
FIGS. 7 and 8 are respective perspective views of another example feedstock processing apparatus.
Figure 8:
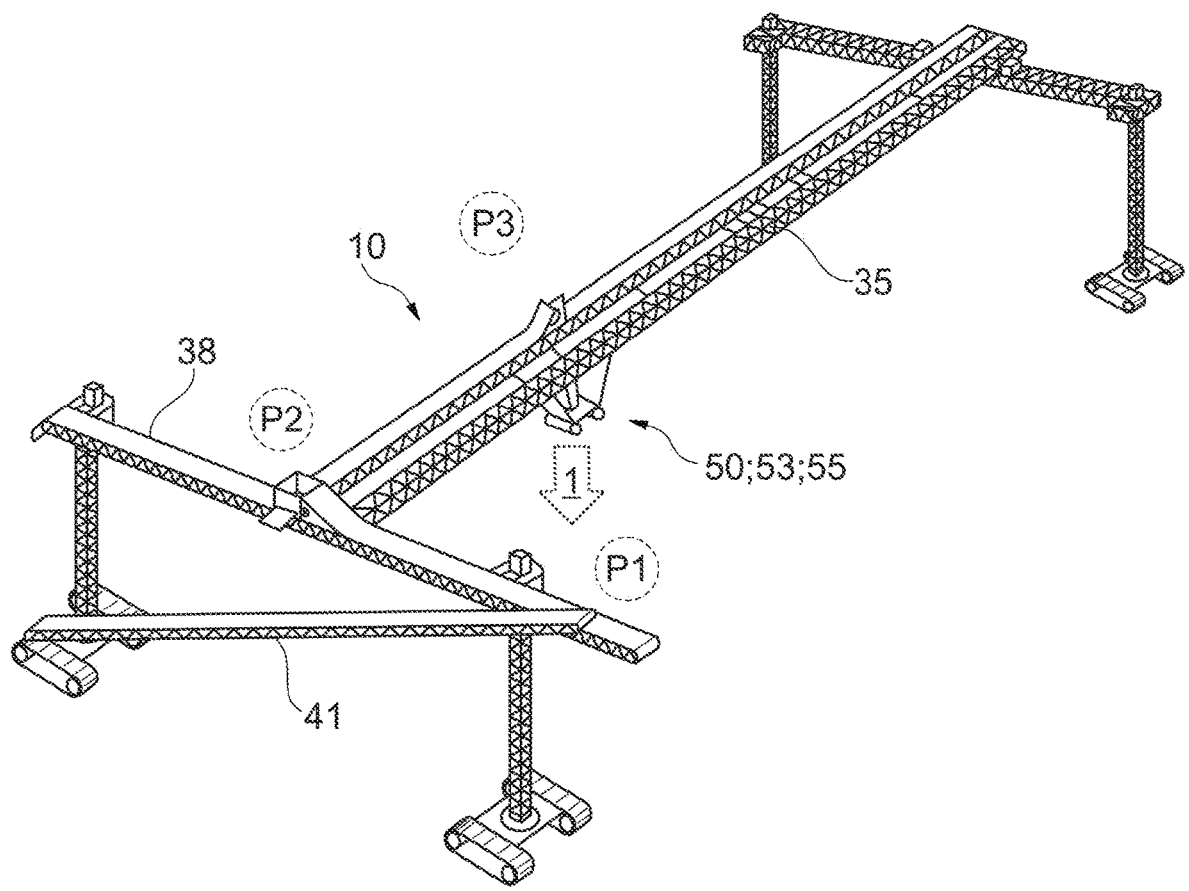

FIG. 1 shows a frame structure 30 erected over a span width x1 and having one or more crossmembers 35, which is/are supported on two or four supports 31, 32 respectively in an undercarriage 21, 22. FIGS. 7, 8 also show such a constructional assembly, in each case with two oppositely situated longitudinal members 38 extending at least approximately parallel to one another.

FIG. 2A shows a mounting of the material distributing device 50 in an arrangement encompassing the frame structure 35. This also provides a high degree of safety and can make the mounting stable, even with regard to high moments of inertia.

Figures 3A, 3B:
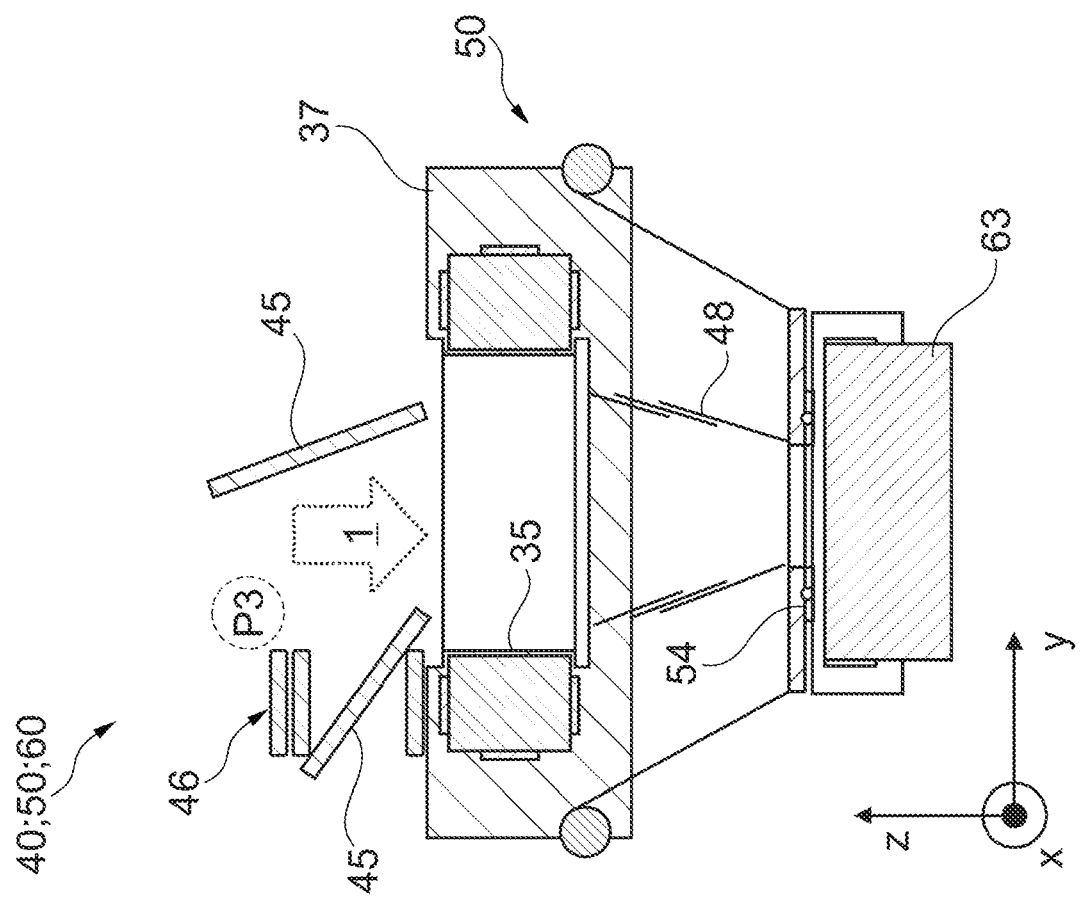
FIGS. 3A, 3B, 4A, and 4B are side views and a plan view of an example material distributing device and a compacting device of a feedstock processing apparatus.

FIG. 3A shows a functional integration of the material distributing device 50 and the compacting device 60, wherein the height-adjustable coupling is effected in particular via traction means 52 in a central arrangement below the material chute 48.

Figure 4B:
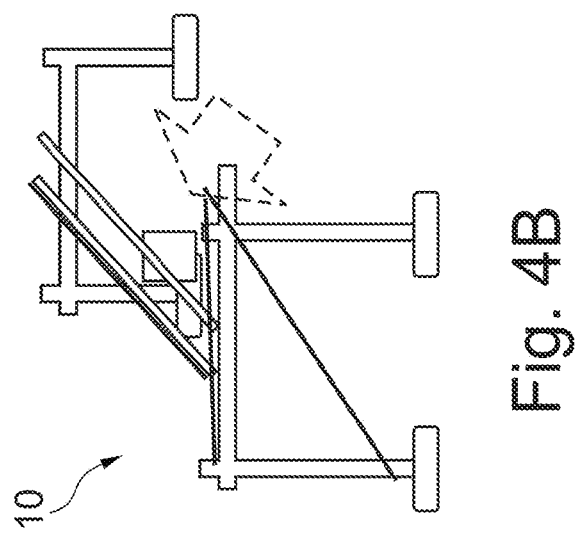
Figure 4A:
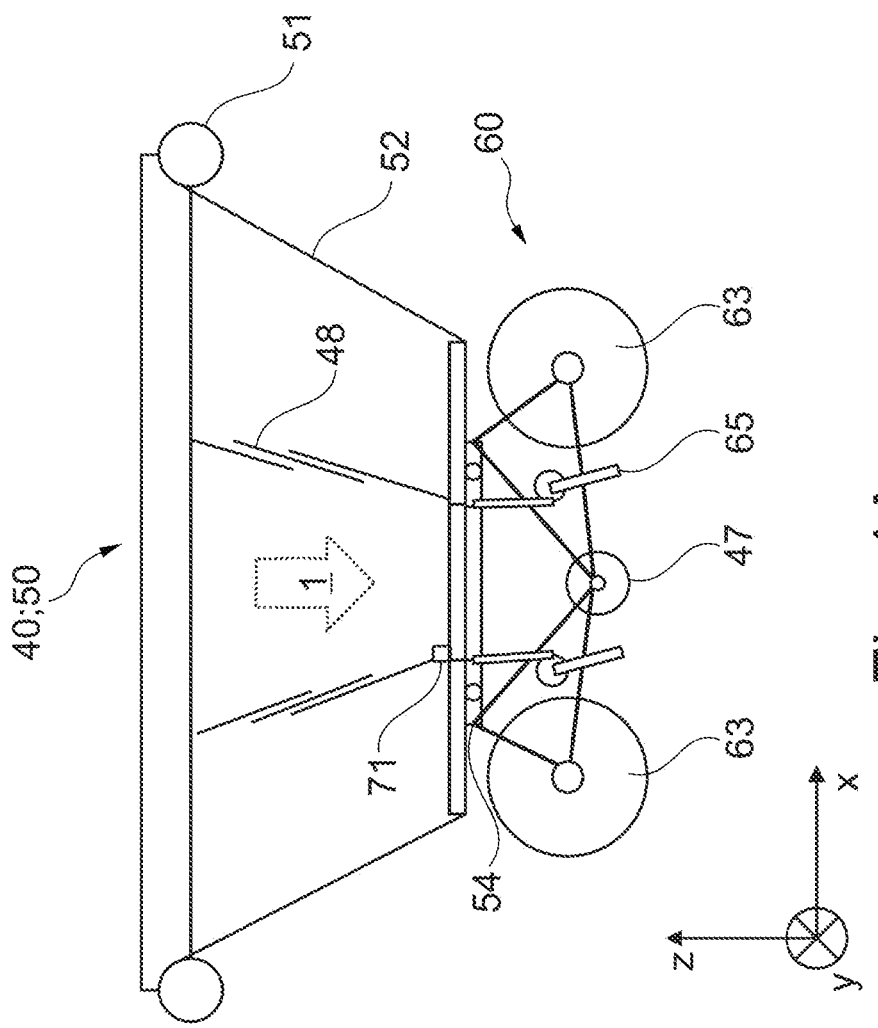

FIG. 4A shows a compacting device 60 comprising two compacting units 63, each rotatably mounted around an individual axis of rotation by means of a rotary mechanism 54, in the form of rollers, wherein the distribution and compaction process can be regulated by means of a screw conveyor 47 and one or more graders 65.

Figure 5:
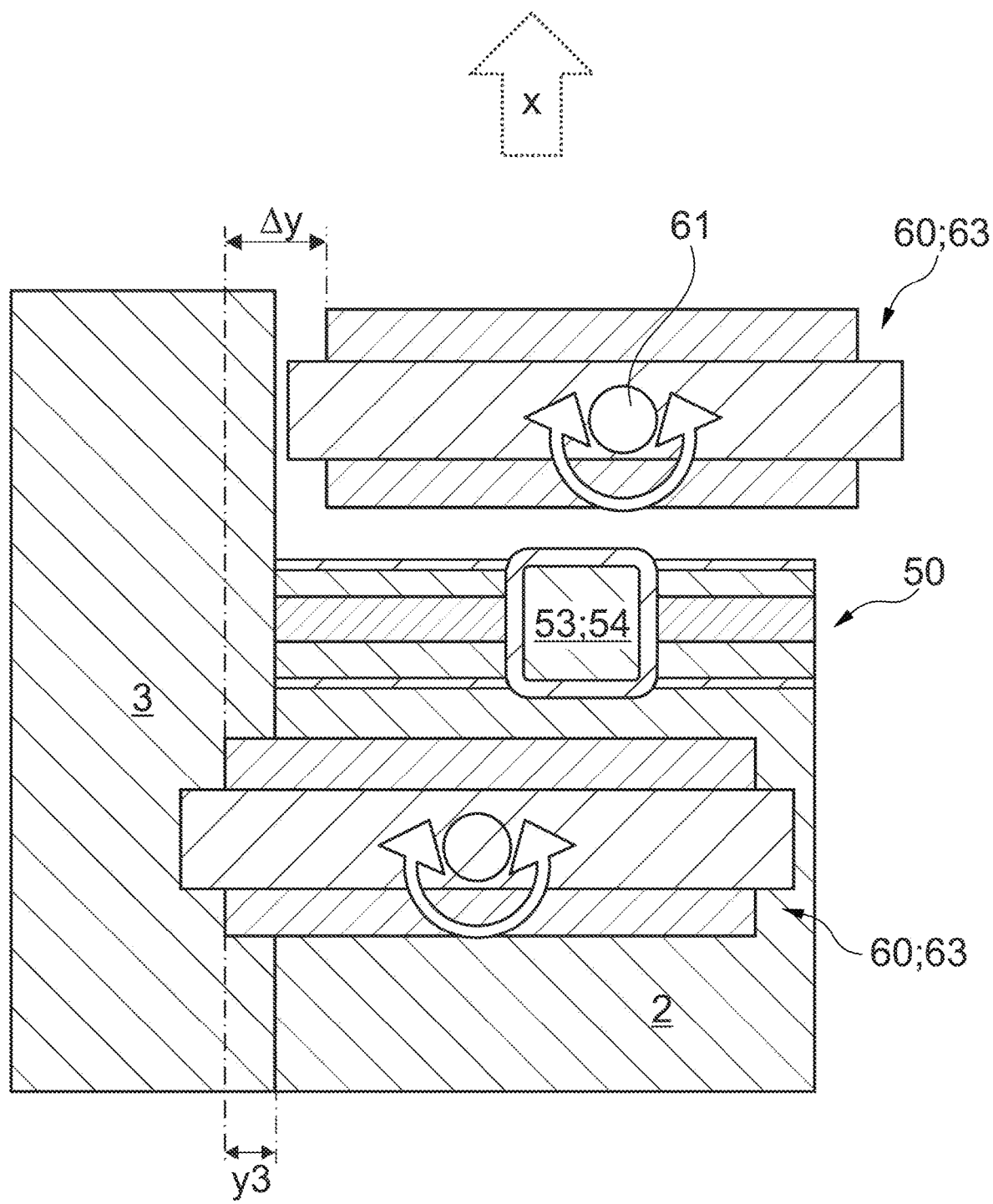
FIG. 5 is a view showing an offset between the two compacting units.

FIG. 5 illustrates an overlap y3 of the one roller 63 in the advancement direction y. The movement path of the compacting device is aligned in the direction x. The two compacting units 63 are arranged relative to one another with an offset Δy to one another that is greater than the overlap y3.

Figure 6:
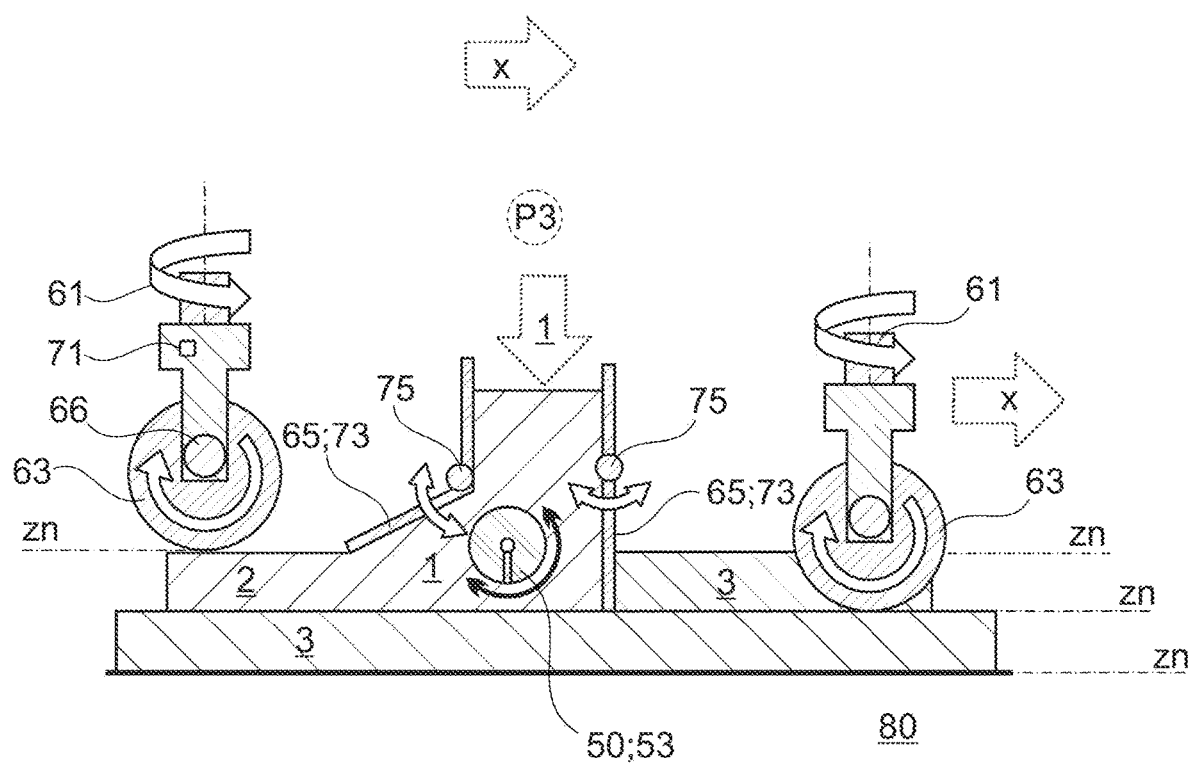
FIG. 6 is a side view of an example compacting device of a feedstock processing apparatus in an arrangement on soil or on a layer to be compacted in a corresponding height level.

The rotary drives 61 and drives 66 of the compacting units 63 are shown in detail in FIG. 6. A material distributing unit 53 is arranged on the material flow path, e.g. in the form of a screw conveyor. The application of the material can be regulated by means of graders 65 or by means of material flow control units 73 mounted around at least one joint 75.

The arrangement shown in FIG. 7 is characterized by a symmetrical assembly with a rectangular base area and four undercarriages. The longitudinal extent of the member 38 is in the region of approximately one third of the extent of the two oppositely situated crossmembers 35 in the width direction. The material distributing device 50 and the compacting device 60 are arranged between them on a further crossmember 35, which can be displaced in the longitudinal direction. A comparable arrangement, but with only one crossmember 35, is shown in FIG. 8.

Figure 9A:
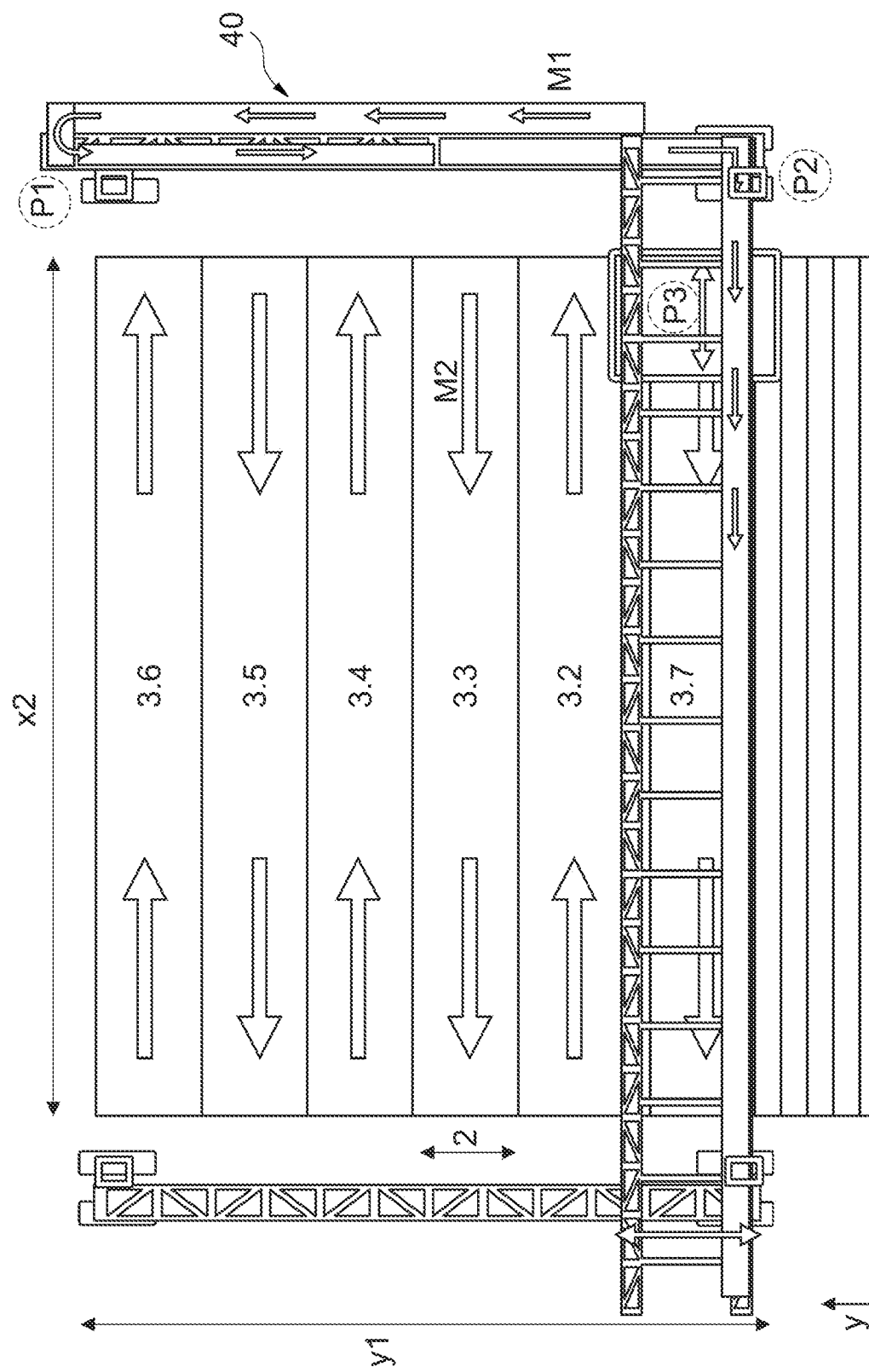
FIG. 9A is a plan view of still another example feedstock processing apparatus.

FIG. 9A illustrates the material flow path M1 up to the application point, and likewise illustrates the material flow path M2 defined by the movement path of the material distributing device: the movement path M2 of the material distributing device is meandering here, with points of reversal arranged in a matrix-like manner between respective unidirectional, in particular one-dimensional movements.

Figure 9B:
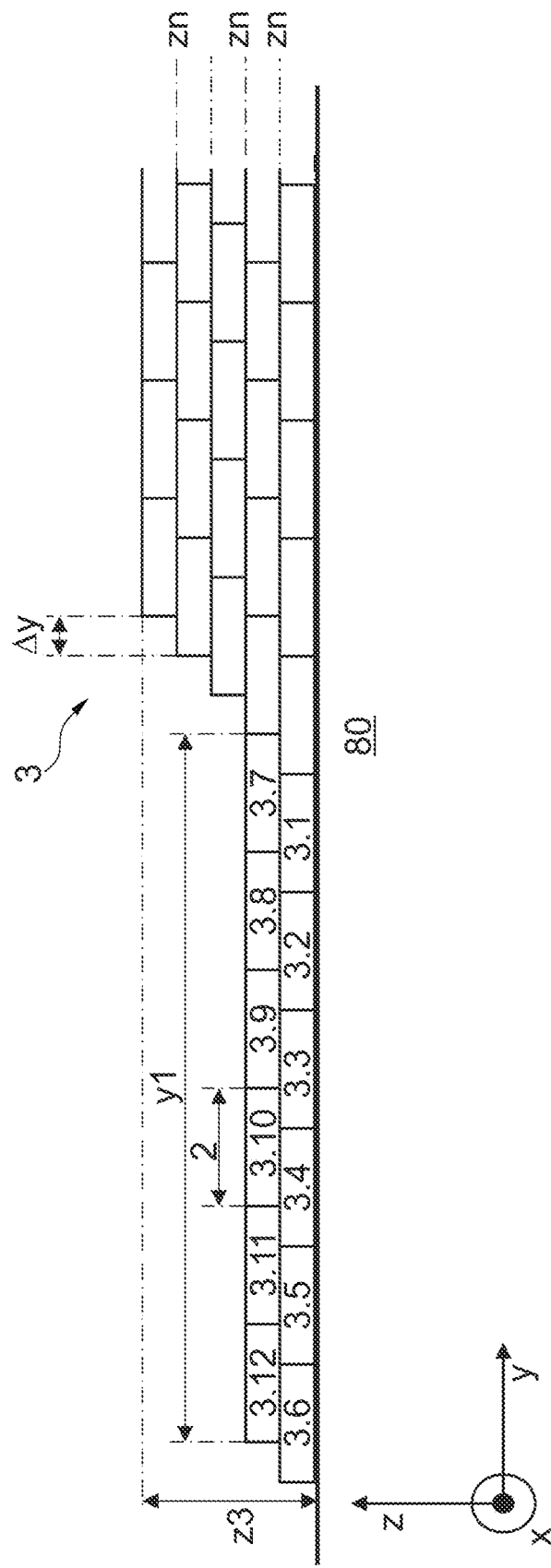
FIG. 9B is a side view illustrating an advantageous way of creating a construction works in layers and horizontal strips.

FIG. 9B illustrates individual horizontal strips 2 or horizontal sections 3.1, ..., 3.6 and 3.7, ..., 3.12, each applied in the desired layer thickness. In this example, five individual height positions $z_n$ are provided above the target height $z_3$ of the construction works, between which height positions a respective y offset is realized, e.g. a y offset corresponding to half the width of the horizontal sections.

Figure 10A:
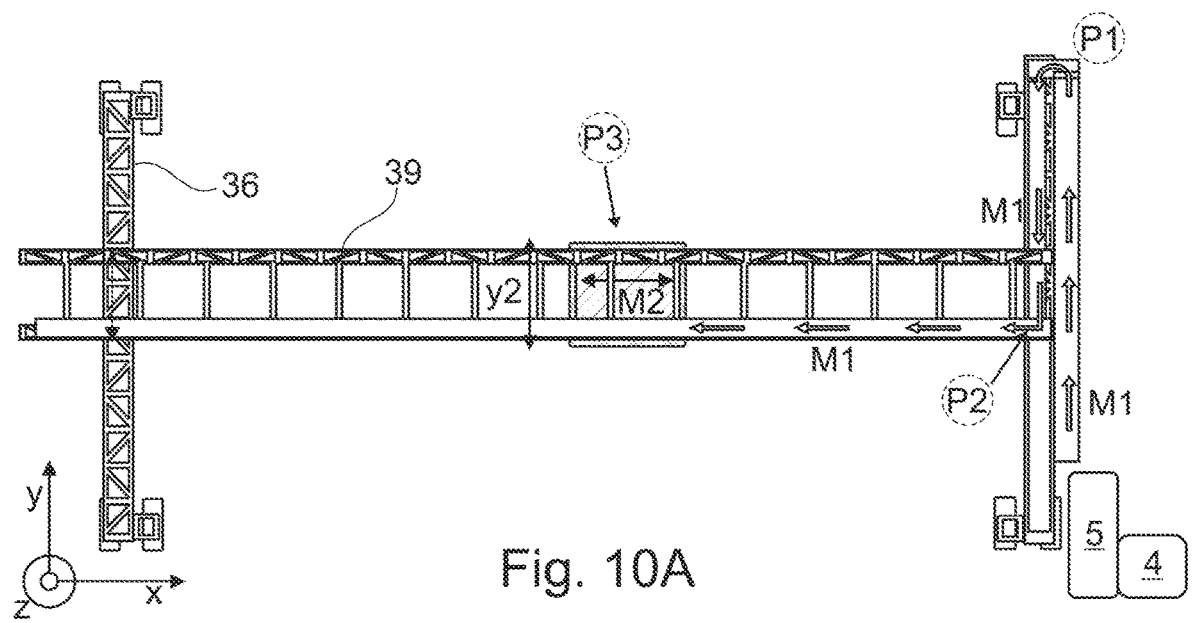
Figure 10B:
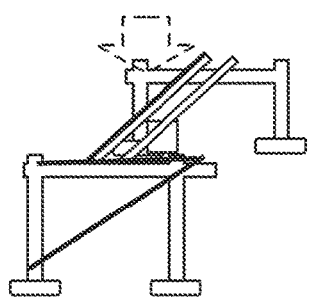

FIGS. 10A, 11A illustrate the material flow using the example of a construction according to FIG. 8. The longitudinal extent y2 is e.g. in the range from 2 m to 5 m. At the three material transfer points P1, P2, P3 there is a respective reversal of direction or change in direction of the movement path and optionally also material buffering. A material transport upwardly in the height direction only has to take place up to the first material transfer point P1 in this case. Further sections of the material flow path are aligned substantially horizontally (at least approximately) on the same height level (apart from any desired height differences at the transfer points P2, P3).

FIG. 12A further shows a material flow unit 49, in particular in the form of a material chute and/or bunker, by means of which the material flow can be regulated or aligned and/or buffered. Corresponding material flow units 49 can also be provided at further material transfer points (P1, P2).

Figure 13:
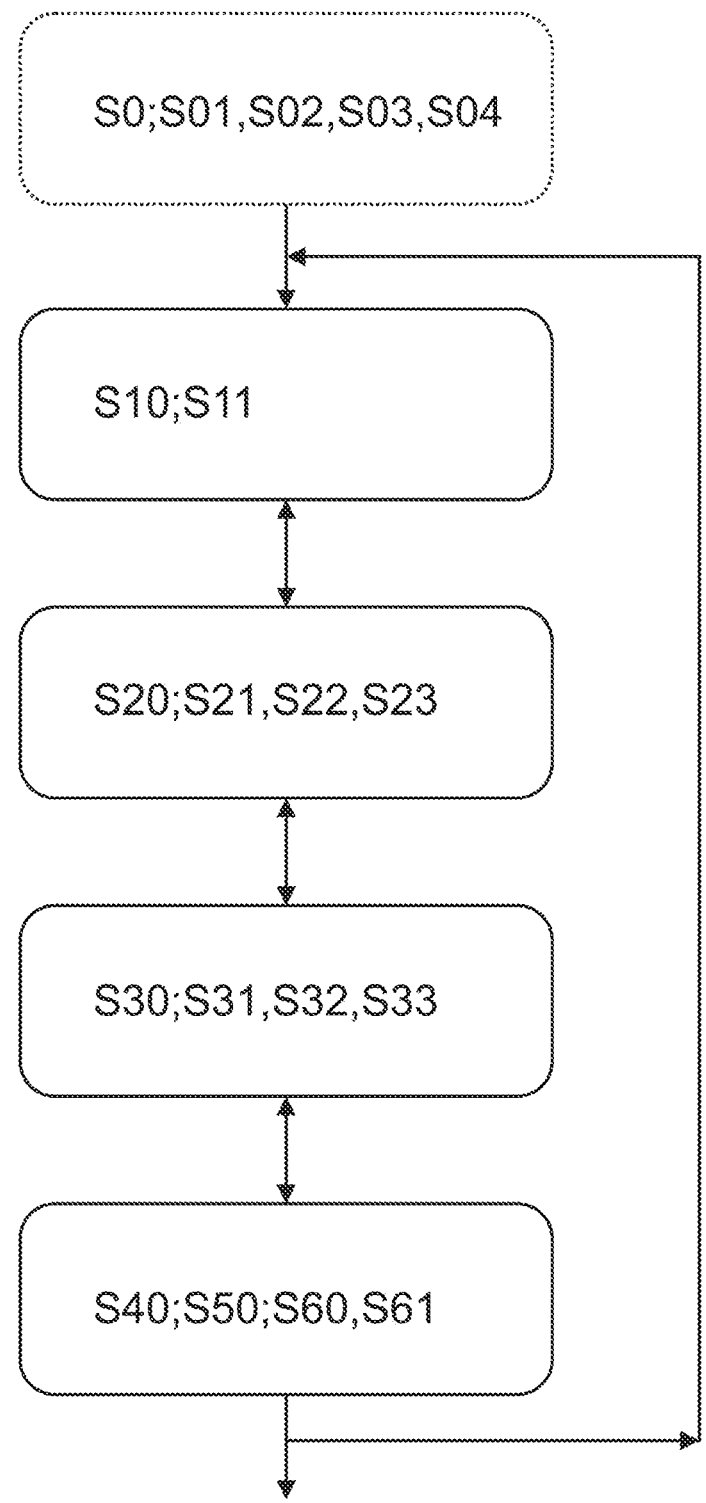
FIG. 13 illustrates an advantageous sequence of an example method.

FIG. 13 generally describes a mode of operation in which/by means of which a material distributing device and at least one compacting unit (or its movement paths) can be controlled in a manner dependent on one another and dependent on the material flow. Here, the movement path of the respective compacting unit may correspond to the movement path of the material distributing device, and may optionally be further differentiated on this movement path (optional situation-dependent direction/tilt compensation).

LIST OF REFERENCE SIGNS

1 Feedstock
2 Horizontal strips
3 Embankment or levee
3.1, 3.2, ..., 3.12, 3.$n$ Horizontal section
4 Material transport unit, in particular truck
5 Material feeding unit, in particular tripper car
10 Feedstock processing apparatus
20 Chassis
21 (First) undercarriage, in particular tracked undercarriage
22 Further (second) undercarriage, in particular tracked undercarriage
23 (First) traction drive
24 Further (second) traction drive
30 Frame structure
31 (First) support, in particular in a vertical alignment
32 Further (second) support, in particular in a vertical alignment
33 Height adjusting means
34 Drive/actuator for height adjusting means, in particular hydraulic
35 Member, in particular crossmember (component of the support structure)
36 Modular frame element
37 Fastening means for at least one tool/device, in particular for a translational relative movement
38 Longitudinal member
39 Guide, in particular translational guide
40 Material feeding device
41 (First) conveying device, in particular conveyor belt
42 Further (second) conveying device, in particular conveyor belt
43 Further (third) conveying device, in particular conveyor belt
44 (First) conveying unit, in particular trolley
45 Further (second) conveying unit, in particular tripper car
46 Further (third) conveying unit, in particular tripper car
47 Further (fourth) conveying unit, in particular screw conveyor
48 Height-adjustable material chute
49 Material flow unit
50 Material distributing device
51 Winch
52 Traction means
53 Material distributing unit
54 Rotary mechanism 55 3D printing unit
60 Compacting device
61 Rotary drive or steering means or steering device
63 Compacting unit, in particular vibratory roller or compaction roller
65 Grader
66 Drive for autonomous propulsion of the compacting device
70 Control device
71 Sensor
73 Material flow control unit
75 Joint or pivot axis
80 Soil
M1 Material flow path up to the application point
M2 Material flow path defined by the movement path of the material distributing device
P1 First material transfer point, in particular continuous material flow
P2 Second material transfer point, in particular continuous material flow
P3 Third material transfer point, in particular continuous material flow
S0 Material flow from P1 to P3
S01 Material transfer in P1, in particular by way of continuous pouring
S02 Material transfer in P2, in particular by way of continuous pouring
S03 Material transfer in P3, in particular by way of continuous pouring
S04 Regulating the material throughput during the conveying
S10 Applying feedstock
S11 Regulating the material throughput when the feedstock is being applied
S20 Compacting feedstock
S21 Compacting upstream of the application point for feedstock
S22 Compacting downstream of the application point for feedstock
S23 Actuating, in particular driving/rotating, at least one compacting unit
S30 Propulsion of material distributing device and compacting device
S31 Propulsion in width direction
S32 Propulsion in working direction
S34 Setting the movement path of the compacting unit
S40 Height positioning and height adjustment
S41 Tilt compensation
S50 Setting the application direction and/or longitudinal offset
S60 Propulsion by chassis (traction drive) in the working direction
S61 Propulsion in accordance with the predefined longitudinal section of the construction works to be erected
x Width or width direction
x1 Span width of the apparatus
x2 Working width of the apparatus
y Working direction or propulsion direction
y1 Length of the apparatus
y2 Longitudinal extent of the material distributing device/ material distributing unit
y3 Overlap
Δy Offset of compacting units or offset of horizontal strips
z Height or height direction (in particular vertical or direction of gravity)
z3 Target height of embankment or construction works
zn Individual height position

What is claimed is:

1. A feedstock processing apparatus configured to apply, distribute, and compact feedstock in defined layer heights, the feedstock processing apparatus comprising:
a chassis with a traction drive, a first undercarriage, and a second undercarriage, wherein at least one of the first undercarriage or the second undercarriage is coupled to the traction drive;
a frame structure that connects the first and second undercarriage over a span width of the feedstock processing apparatus and provides a working width for the feedstock processing apparatus between the first and second undercarriages;
a material feeding device coupled to or supported on the frame structure;
a material distributing device that is coupled to the material feeding device, that is displaceable at least in certain sections over the span width, that is mounted on the frame structure, and that is positionable at a plurality of application positions within the span width, wherein the material distributing device is configured to apply the feedstock in layers on soil in different, predefinable height positions between the first and second undercarriages;
a control device configured to activate the material distributing device and to set a layer thickness of the feedstock applied in layers; and
a compacting device that is displaceably mounted on at least one of the frame structure or the material distributing device, the compacting device being connected in terms of material flow to the material feeding device, wherein the compacting device includes at least two compacting units configured as a drum or a roller with a rolling axis, in an articulated mount configured to be positionable or alignable relative to one another so that a movement path of the compacting device represents crab steering,
wherein the control device is configured to regulate a respective movement path of the compacting device and the material distributing device in a manner dependent on one another respectively within the working width.

2. The feedstock processing apparatus of claim 1 wherein at least one of:
the compacting device or a compacting unit of the compacting device is mounted rotatably around a height axis or around an axis of rotation inclined at an angle of less than 45° to the height axis, wherein the control device is configured to set a steering deflection of the compacting unit around the height axis or the axis of rotation; or
the compacting device or a compacting unit of the compacting device is mounted in a height-adjustable manner, wherein the control device is configured to set a height position and/or an inclination of the compacting unit.

3. A feedstock processing apparatus configured to apply, distribute, and compact feedstock in defined layer heights, the feedstock processing apparatus comprising:
a chassis with a traction drive and an undercarriage;
a frame structure that provides a working width for the feedstock processing apparatus;
a material feeding device coupled to or supported on the frame structure;
a material distributing device that is coupled to the material feeding device, that is displaceable at least in certain sections over the working width, that is mounted on the frame structure, and that is positionable at a plurality of application positions within the working width, wherein the material distributing device is configured to apply the feedstock in layers on soil in different, predefinable height positions within the working width;

a control device configured to activate the material distributing device and to set a layer thickness of the feedstock applied in layers; and a compacting device that is displaceably mounted on at least one of the frame structure or the material distributing device, the compacting device being connected in terms of material flow to the material feeding device, wherein the compacting device includes at least two compacting units configured as a drum or a roller with a rolling axis, in an articulated mount configured to be positionable or alignable relative to one another so that a movement path of the compacting device represents crab steering, wherein the control device is configured to regulate a respective movement path of the compacting device and the material distributing device in a manner dependent on one another respectively within the working width.

4. The feedstock processing apparatus of claim 3 wherein the undercarriage is a first undercarriage, wherein the chassis includes a second undercarriage, wherein the frame structure is supported on the first and second undercarriages and defines a span width of the feedstock processing apparatus, wherein the frame structure provides between the first and second undercarriages the working width for the material distributing device and the compacting device, wherein the material distributing device and the compacting device are each displaceable on the frame structure within the working width.

5. The feedstock processing apparatus of claim 3 wherein the compacting device includes a compacting unit configured to be inclined about an axis of inclination relative to a horizontal plane.

6. The feedstock processing apparatus of claim 3 wherein at least one of:

the material distributing device and the compacting device are configured to distribute and compact the feedstock in horizontal strips with a predefinable longitudinal extent; or the feedstock processing apparatus is configured to apply, distribute, and compact the feedstock in horizontal strips that are created in a row one after another in a propulsion direction over the working width, with a respective translational displacement of the material distributing device and the compacting device exclusively in a width direction, with a matrix-like movement path with graduated displacement of the undercarriage in the propulsion direction.

7. The feedstock processing apparatus of claim 3 wherein the frame structure includes a longitudinal member that extends at least approximately in an advancement direction of the traction drive and extends over a length corresponding to a multiple of an individual horizontal strip to be created of construction works to be created or over a length corresponding to a multiple of a longitudinal extent of a cross-member of the frame structure that mounts the material distributing device and the compacting device.

8. The feedstock processing apparatus of claim 3 wherein the feedstock processing apparatus defines at least three material transfer points on a material flow path defined by the feedstock processing apparatus from a delivering material transport unit to an application point defined by a material distributing unit of the material distributing device, the at least three material transfer points comprising:

a first material transfer point from a first continuously-conveying device to a second continuously-conveying device;

a second material transfer point from the second continuously-conveying device to a third continuously-conveying device; and a third material transfer point from the third continuously-conveying device to the material distributing device.

* * * * *